(12) United States Patent
Lee

(10) Patent No.: US 12,718,490 B2
(45) Date of Patent: Aug. 25, 2026

(54) ELECTRONIC DEVICE AND METHOD FOR DISPLAYING MODIFICATION OF VIRTUAL OBJECT AND METHOD THEREOF

(71) Applicant: SAMSUNG ELECTRONICS CO., LTD., Suwon-si (KR)

(72) Inventor: Hwajun Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/067,550

(22) Filed: Feb. 28, 2025

(65) Prior Publication Data

US 2025/0200899 A1 Jun. 19, 2025

Related U.S. Application Data

(63) Continuation of application No. 18/384,459, filed on Oct. 27, 2023, now Pat. No. 12,266,056, which is a (Continued)

(30) Foreign Application Priority Data

Oct. 25, 2022 (KR) ........................ 10-2022-0138757
Nov. 1, 2022 (KR) ........................ 10-2022-0143875
Oct. 19, 2023 (KR) ........................ 10-2023-0140766

(51) Int. Cl.
*G06T 19/00* (2011.01)
*G06F 3/01* (2006.01)
*G06F 3/16* (2006.01)

(52) U.S. Cl.
CPC .............. *G06T 19/00* (2013.01); *G06F 3/013* (2013.01); *G06F 3/167* (2013.01); *G06T 2200/24* (2013.01)

(58) Field of Classification Search
None
See application file for complete search history.

(56) References Cited

U.S. PATENT DOCUMENTS 8,446,414 B2 5/2013 Reville et al.
9,176,579 B2 11/2015 Hyndman et al.
(Continued)

FOREIGN PATENT DOCUMENTS

JP 6649453 B2 1/2020
JP 6821461 B2 1/2021
(Continued)

OTHER PUBLICATIONS

International Search Report and Written Opinion for International Application No. PCT/KR2023/016427; International Filing Date Oct. 20, 2023; Date of Mailing Feb. 8, 2024, 9 Pages.
(Continued)

*Primary Examiner* — Kenneth Bukowski
(74) *Attorney, Agent, or Firm* — CANTOR COLBURN LLP

(57) ABSTRACT

According to an embodiment, at least one processor of a wearable device may display, based on an input for entering a virtual space, on a display the virtual space. The at least processor may display within the virtual space a first avatar which is a current representation of a user and has a first appearance. The at least processor may display within the virtual space a first avatar together with a visual object for a second avatar which is a previous representation of the user and has a second appearance different from the first appearance of the first avatar. For example, the metaverse service is provided through a network based on 5G (fifth generation), and/or 6G (sixth generation).

17 Claims, 14 Drawing Sheets

Related U.S. Application Data continuation of application No. PCT/KR2023/016427, filed on Oct. 20, 2023.

(56) References Cited

U.S. PATENT DOCUMENTS 9,597,602 B2 3/2017 Shimohata et al.
10,659,405 B1 * 5/2020 Chang .................. G06F 3/0482
10,789,753 B2 * 9/2020 Miller, IV .............. G06F 3/012
11,119,568 B2 9/2021 Bodolec et al.
11,416,067 B2 8/2022 Bodolec et al.
11,925,869 B2 3/2024 Blackstock et al.
12,430,088 B2 * 9/2025 Oshima ................ G06F 3/1292
2009/0164916 A1 6/2009 Jeong et al.
2010/0009747 A1 * 1/2010 Reville .................. A63F 13/30 463/31
2010/0045697 A1 2/2010 Reville et al.
2010/0079467 A1 4/2010 Boss et al.
2015/0199494 A1 7/2015 Koduri et al.
2017/0352179 A1 12/2017 Hardee et al.
2018/0322681 A1 11/2018 Inomata et al.
2019/0004639 A1 1/2019 Faulkner
2019/0005732 A1 1/2019 Satake
2019/0266807 A1 * 8/2019 Lee ........................ G06T 13/40
2020/0226811 A1 7/2020 Kim et al.
2020/0342648 A1 * 10/2020 Shimizu .................. A61B 5/16
2021/0065447 A1 3/2021 Lee
2022/0031068 A1 * 2/2022 Jang ...................... G06V 10/26
2022/0124125 A1 4/2022 Punwani et al.
2022/0230379 A1 7/2022 Shriram et al.
2022/0374137 A1 * 11/2022 Triverio ............. G06F 3/04845
2022/0413608 A1 12/2022 Grzesiak
2024/0135650 A1 4/2024 Lee
2025/0167998 A1 * 5/2025 Mian ..................... G16H 50/50

FOREIGN PATENT DOCUMENTS

KR 20090067822 A 6/2009
KR 20210127054 A * 10/2021 ........ H04M 1/27453
KR 20220065039 A 5/2022
WO 2010009175 A2 1/2010

OTHER PUBLICATIONS

Extended European Search Report Issued In EP Application No. 23883020.2-1218; Mail Date Dec. 8, 2025; 10 Pages.

* cited by examiner

ELECTRONIC DEVICE AND METHOD FOR DISPLAYING MODIFICATION OF VIRTUAL OBJECT AND METHOD THEREOF

CROSS-REFERENCE TO RELATED APPLICATION(S)

This application is a continuation application of U.S. application Ser. No. 18/384,459, filed on Oct. 27, 2023, claiming priority under § 365(c), of PCT International Application No. PCT/KR2023/016427 filed on Oct. 20, 2023, which is based on and claims the benefit of Korean patent application number 10-2023-0140766 filed on Oct. 19, 2023, in the Korean Intellectual Property Office and of Korean patent application number 10-2022-0143875 filed on Nov. 1, 2022, in the Korean Intellectual Property Office, and of Korean patent application number 10-2022-0138757 filed on Oct. 25, 2022, in the Korean Intellectual Property Office, the disclosures of which are incorporated by reference herein in their entireties.

BACKGROUND

Technical Field

The present disclosure relates to an electronic device for displaying a modification of a virtual object and a method thereof.

Description of Related Art

In order to provide enhanced user experience, an electronic device providing an augmented reality (AR) service that displays information generated by a computer in association with an external object in the real-world is being developed. The electronic device may be a wearable device worn by a user. For example, the electronic device may be AR glasses and/or a head-mounted device (HMD).

SUMMARY

According to an embodiment, a wearable device may comprise a display, a processor, memory storing instructions. The instructions may, when executed by the processor, cause the wearable device to, based on receiving an input for entering a virtual space, display on the display the virtual space. The instructions may, when executed by the processor, cause the wearable device to display within the virtual space a first avatar which is a current representation of a user and has a first appearance. The instructions may, when executed by the processor, cause the wearable device to display within the virtual space a first avatar together with a visual object for a second avatar which is a previous representation of the user and has a second appearance different from the first appearance of the first avatar.

According to an embodiment, a non-transitory computer-readable medium may be configured to store instructions. The instructions may be configured to, when executed by at least one processor of a wearable device, cause the at least one processor to, based on receiving an input for entering a virtual space, display on a display of the wearable device the virtual space. The instructions may be configured to, when executed by at least one processor of a wearable device, cause the at least one processor to display within the virtual space a first avatar which is a current representation of a user and has a first appearance. The instructions may be configured to, when executed by at least one processor of a wearable device, cause the at least one processor to display within the virtual space a first avatar together with a visual object for a second avatar which is a previous representation of the user and has a second appearance different from the first appearance of the first avatar.

According to an embodiment, a method of a wearable device comprising a display, memory and a processor is provided. The method may comprise, based on receiving an input for entering a virtual space, displaying on the display the virtual space. The method may comprise displaying within the virtual space a first avatar which is a current representation of a user and has a first appearance. The method may comprise displaying within the virtual space a first avatar together with a visual object for a second avatar which is a previous representation of the user and has a second appearance different from the first appearance of the first avatar.

According to an embodiment, a wearable device may comprise a display, a memory for storing instructions and at least one processor for executing the instructions. The at least processor may be configured to receive, based on an input indicating to enter a virtual space, information from an external electronic device that is associated with an avatar positioned within the virtual space. The at least processor may be configured to display, based on receiving the information, at least portion of the virtual space including the avatar of a first appearance. The at least processor may be configured to display, based on the information further including the avatar of a second appearance which was displayed by the wearable device before receiving the input, a visual object with the avatar which represents the avatar of the second appearance.

According to an embodiment, a non-transitory computer-readable medium may be configured to store instructions. The instructions may be configured to, when executed by at least one processor of a wearable device, cause the at least one processor to receive, based on an input indicating to enter a virtual space, information from an external electronic device that is associated with an avatar positioned within the virtual space. The instructions may be configured to, when executed by at least one processor of a wearable device, cause the at least one processor to display, based on receiving the information, at least portion of the virtual space including the avatar of a first appearance. The instructions may be configured to, when executed by at least one processor of a wearable device, cause the at least one processor to display, based on the information further including the avatar of a second appearance which was displayed by the wearable device before receiving the input, a visual object with the avatar which represents the avatar of the second appearance.

According to an embodiment, a method of an electronic device may comprise identifying, based on a request of a wearable device for entering a virtual space, information of an avatar within the virtual space. The method may comprise, based on identifying the information of the avatar of a first appearance, transmitting, based on identifying that the avatar of the first appearance is different from the avatar of a second appearance which was displayed by the wearable device before the request, the information to the wearable device including the avatar of the first appearance and a history of modification of the avatar from the second appearance to the first appearance. The method may comprise, based on identifying the information of the avatar of the first appearance, transmitting, based on identifying that the avatar of the first appearance is identical to the avatar of the second appearance, the information to the wearable device including the avatar of the first appearance without the history.

According to an embodiment, an electronic device may comprise a display, a communication circuitry, and a processor. The processor may be configured to display, based on information received from an external electronic device connected through the communication circuitry, a first visual object representing a user in the display. The processor may be configured to identify, based on the information, a number of times that the first visual object has been displayed through the display. The processor may be configured to display, based on identifying the number of times is lower than a preset number, a second visual object representing the user before the first visual object, with the first visual object in the display.

According to an embodiment, a method of an electronic device may comprise displaying, based on information received from an external electronic device connected through a communication circuitry of the electronic device, a first visual object representing a user in a display of the electronic device. The method may comprise identifying, based on the information, a number of times that the first visual object has been displayed through the display. The method may comprise displaying, based on identifying the number of times is lower than a preset number, a second visual object representing the user before the first visual object, with the first visual object in the display.

According to an embodiment, an electronic device may comprise a display, a communication circuitry, and a processor. The processor may be configured to display, to a first user of the electronic device through the display, a first visual object which represents a second user and is included in a virtual space. The processor may be configured to obtain, from an external electronic device through the communication circuitry, information indicating a visual object has been browsed by the first user. The processor may be configured to display, based on identifying a second visual object different from the first visual object from the information, the second visual object with the first visual object that is displayed to the first user.

According to an embodiment, a method of an electronic device may comprise displaying, to a first user of the electronic device, a first visual object which represents a second user and is included in a virtual space. The method may comprise obtaining, from an external electronic device, information indicating a visual object has been browsed by the first user. The method may comprise displaying, based on identifying a second visual object different from the first visual object from the information, the second visual object with the first visual object that is displayed to the first user.

DETAILED DESCRIPTION

Figure 1:
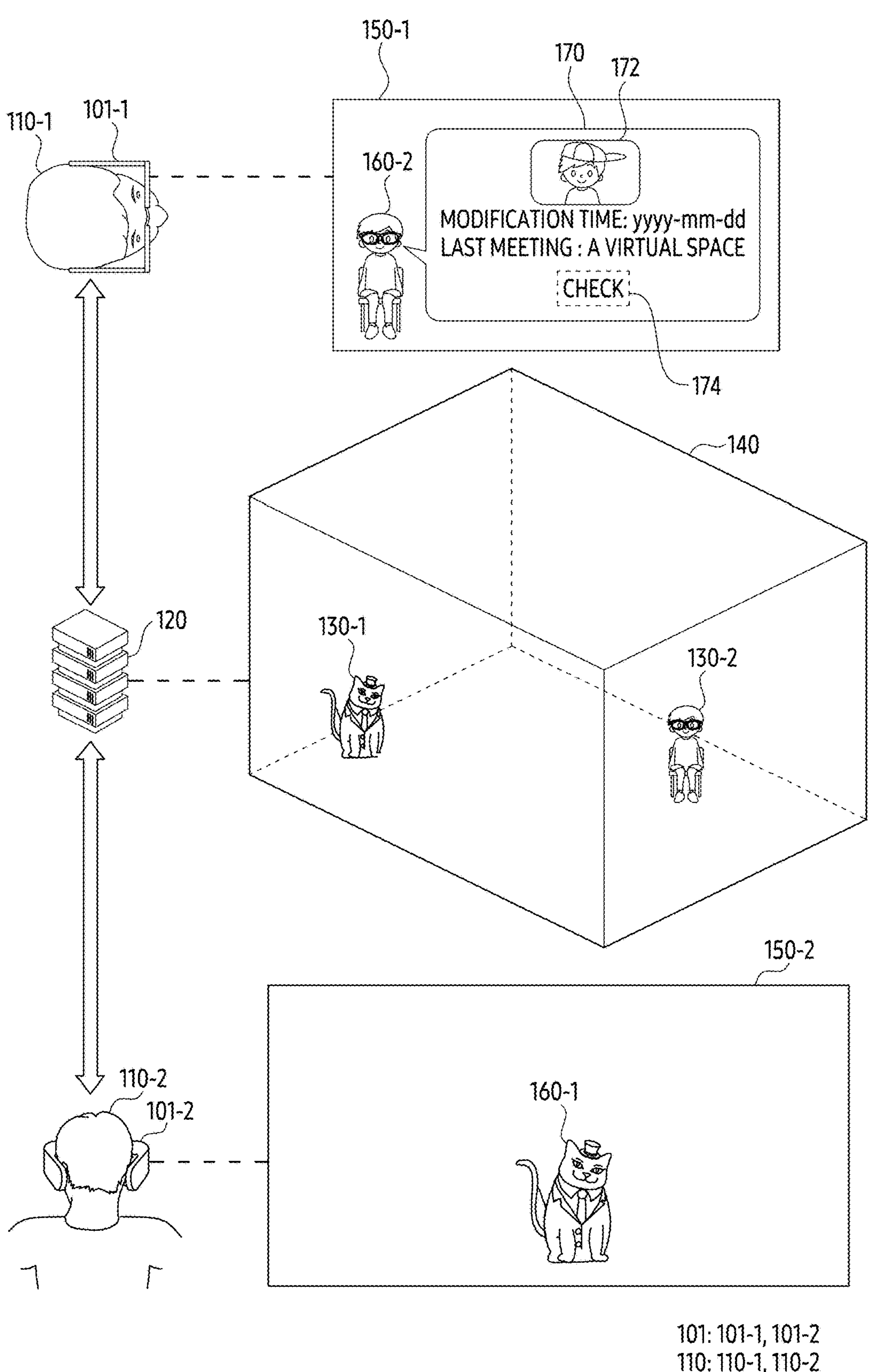
FIG. 1 illustrates an example of a user interface (UI) displayed by an electronic device based on information obtained from an external electronic device, according to an embodiment.

Hereinafter, various embodiments of the present document will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 illustrates an example of a user interface (UI) displayed by an electronic device based on information obtained from an external electronic device, according to an embodiment. FIG. 1 is a diagram illustrating a plurality of electronic devices connected to each other based on a network. Referring to FIG. 1, an exemplary situation in which a first electronic device 101-1, a second electronic device 101-2, and a third electronic device 120 are connected to each other based on a wired network and/or a wireless network is illustrated. Hardware components included in a plurality of electronic devices of FIG. 1 will be described with reference to FIG. 2.

The wired network may include a network such as the Internet, a local area network (LAN), a wide area network (WAN), Ethernet, or a combination thereof. The wireless network may include a network such as long term evolution (LTE), 5g new radio (new radio), wireless fidelity (Wi-Fi), Zigbee, near field communication (NFC), Bluetooth, Bluetooth low-energy (BLE), or a combination thereof. Although a plurality of electronic devices in FIG. 1 are shown to be directly connected, the plurality of electronic devices may be indirectly connected through one or more intermediate nodes (e.g., a router and/or an access point).

Referring to FIG. 1, the first electronic device 101-1 and the second electronic device 101-2 may be terminals owned by a user (e.g., a user 110 including a first user 110-1 and a second user 110-2, respectively). The terminal may include, for example, a personal computer (PC) such as a laptop and a desktop, a smartphone, a smartpad, and/or a tablet PC. The terminal may include a smart accessory such as a smartwatch and/or a head-mounted device (HMD). Referring to FIG. 1, exemplary forms of a first electronic device 101-1 and a second electronic device 101-2 having a form factor of HMD are illustrated, but embodiments are not limited thereto. Hereinafter, a terminal including the first electronic device 101-1 and the second electronic device 101-2 may be referred to as the electronic device 101. The user 110 of the electronic device 101 may be subscribers of a service provided by a third electronic device 120.

Referring to FIG. 1, the third electronic device 120 may include a server of a service provider. The server may include one or more PCs and/or workstations. In an embodiment, the service provider may operate a video conference and/or a metaverse service as a service that enhances interconnectivity between subscribers. Hereinafter, the third electronic device 120 may be referred to as the external electronic device 120 in terms of being distinguished from the electronic device 101 which is a terminal for a user.

According to an embodiment, the electronic device 101 may provide a user experience based on a virtual space 140 to the user 110 of the electronic device 101. The electronic device 101 may communicate with the external electronic device 120 to obtain information on the virtual space 140. Although an embodiment in which the electronic device 101 visualizes at least a portion of the virtual space 140 based on the information is described, the embodiment is not limited thereto. For example, the electronic device 101 may output an audio signal related to the virtual space 140. For example, the electronic device 101 may output vibration related to the virtual space 140.

Referring to FIG. 1, the external electronic device 120 may provide functions related to an immersive service platform using at least one virtual space (e.g., a virtual space 140). The external electronic device 120 may arrange one or more virtual objects in the virtual space 140 formed along a coordinate system (e.g., a two-dimensional coordinate system or a three-dimensional coordinate system) formed by a plurality of axes (e.g., an x-axis, a y-axis, and/or a z-axis). Referring to FIG. 1, a first virtual object 130-1 and a second virtual object 130-2 disposed in the virtual space 140 by the external electronic device 120 are illustrated. The external electronic device 120 may dispose an avatar representing the user 110 of the electronic device 101 in the virtual space 140 based on a signal received from the electronic device 101 (e.g., a signal for accessing the virtual space 140). The avatar may be referred to as a character.

In an embodiment, the avatar may be generated by using information associated with a user. The avatar may include, as a combination of three-dimensional graphical objects, a combination of a virtual object representing one or more garments and a virtual object representing a body part (e.g., portion of the user such as upper body and/or entire body of the user). The avatar may be generated by the electronic device 101 receiving a user input for combining or for modifying one or more virtual objects. The embodiments are not limited thereto, and the avatar may be generated by the electronic device 101 receiving a photograph representing a face and/or a body part of the user.

In an embodiment of FIG. 1, the first virtual object 130-1 may be an avatar representing the first user 110-1 of the first electronic device 101-1, and the second virtual object 130-2 may be an avatar representing the second user 110-2 of the second electronic device 101-2. A location, size, and/or shape of the avatar in the virtual space 140 may be modified by a signal transmitted by the electronic device 101 to the external electronic device 120. For example, the electronic device 101 may transmit the signal to the external electronic device 120 based on an input of the user 110 corresponding to the avatar. The input of user 110 may include an input indicating moving of the avatar in the virtual space 140. The virtual object disposed in the virtual space 140 is not limited to the avatar, and the external electronic device 120 may dispose another virtual object (e.g., a terrain and/or a virtual object representing a building) different from the avatar in the virtual space 140.

According to an embodiment, the electronic device 101 may display at least a portion of the virtual space 140 in the screen. Referring to FIG. 1, a portion of the virtual space 140 displayed by the first electronic device 101-1 in the screen 150-1 of the first electronic device 101-1 is exemplarily illustrated. The portion of the virtual space 140 displayed in the screen 150-1 of the first electronic device 101-1 may be at least a portion of the virtual space 140 included in a viewing angle of the first virtual object 130-1. The first virtual object 130-1 may be an avatar representing the first user 110-1 of the first electronic device 101-1. In the virtual space 140, since the second virtual object 130-2 is included in the viewing angle of the first virtual object 130-1, the second visual object 160-2 representing the second virtual object 130-2 may be displayed in the screen 150-1 of the first electronic device 101-1. It is noted that the second visual object 160-2 is distinctively labeled in the screen 150-1 of the first electronic device 101-1, although the second visual object 160-2 represents the second virtual object 130-2. When the second virtual object 130-2 is a three-dimensional object based on a three-dimensional coordinate system, the second visual object 160-2 may be an image of the second virtual object 130-2 that is projected onto a view angle of the first virtual object 130-1 in the virtual space 140.

Referring to FIG. 1, a portion of the virtual space 140 displayed by the second electronic device 101-2 in the screen 150-2 of the second electronic device 101-2 is exemplarily illustrated. In the virtual space 140, when the first virtual object 130-1 is included in a viewing angle of the second virtual object 130-2, the second electronic device 101-2 may display a first visual object 160-1 representing the first virtual object 130-1 in the screen 150-2. It is noted that the first visual object 160-1 is distinctively labeled in the screen 150-2 of the second electronic device 101-2, although the first visual object 160-1 represents the first virtual object 130-1. As described above, the electronic device 101 including the first electronic device 101-1 and the second electronic device 101-2 may display to the user 110 of the electronic device 101 a visual object included in the virtual space 140 and representing a user different from the user 110 of the electronic device 101.

According to an embodiment, in a state in which a visual object corresponding to a user different from the user 110 of the electronic device 101 is displayed, the electronic device 101 may display a history in which a virtual object (e.g., an avatar) corresponding to the visual object has been modified to the user 110. For example, in the screen 150-1 in which the second visual object 160-2 representing the second virtual object 130-2 is displayed, the first electronic device 101-1 may display a visual object 170 based on a history in which the second virtual object 130-2 has been modified. In an embodiment in which the second virtual object 130-2 is an avatar corresponding to the second user 110-2, the first electronic device 101-1 may display a history in which the avatar has been modified in the visual object 170.

Referring to FIG. 1, a visual object 170 having a form of a bubble is illustrated, but an embodiment is not limited thereto. In visual object 170, the first electronic device 101-1 may display a visual object 172 representing another virtual object previously displayed to the first user 110-1 before the second virtual object 130-2 corresponding to the second visual object 160-2. For example, the visual object 172 may indicate the other virtual object that has been displayed through the display of the first electronic device 101-1, as a representation of the second user 110-2 before the second virtual object 130-2 corresponding to the second visual object 160-2. In the visual object 170, the first electronic device 101-1 may display text (e.g., "modification time: yyyy-mm-dd" representing year-month-day) that guides a timing (or a moment) at which the avatar corresponding to the second user 110-2 has been modified. In the visual object 170, the first electronic device 101-1 may display text (e.g., "Last meeting: A virtual space") that guides a location in the virtual space 140 where the first user 110-1 and the second user 110-2 interacted. In visual object 170, the first electronic device 101-1 may display a visual object 174 as a shape of a button including a preset text (e.g., "check"). The first electronic device 101-1 may cease, in response to an input indicating to select the visual object 174, to display the visual object 170.

For example, after communicating with the first user 110-1 based on the virtual space 140, the second user 110-2 may modify at least a portion of the second virtual object 130-2 corresponding to the second user 110-2. In a state in which at least a portion (e.g., the second visual object 160-2) of the second virtual object 130-2 is displayed through the display of the first electronic device 101-1, the external electronic device 120 and/or the first electronic device 101-1 may identify whether the second user 110-2 has modified at least a portion of the second virtual object 130-2. In the case that a communication between the first user 110-1 and the second user 110-2 occurs in the virtual space 140 within the first timing and at least a portion of the second virtual object 130-2 has been modified within the second timing after the first timing, the first electronic device 101-1 may identify that at least a portion of the second virtual object 130-2 has been modified within the third timing after the second timing. The first electronic device 101-1 may display the visual object 172 that has been browsed by the first user 110-1 within the first timing together with the second visual object 160-2 representing the second virtual object 130-2 within the third timing.

Referring to FIG. 1, the first electronic device 101-1 may visualize a history in which the second virtual object 130-2 representing the second user 110-2 has been modified in the virtual space 140, by displaying the second visual object 160-2 and the visual object 172. Since the first electronic device 101-1 visualizes the history in which the second virtual object 130-2 has been modified, the first user 110-1 of the first electronic device 101-1 may more quickly identify the second visual object 160-2 corresponding to the second virtual object 130-2 corresponding to the second user 110-2 based on the history. Like the visual object 170, an example of a user interface (UI) that the first electronic device 101-1 displays to visualize the history in which the second virtual object 130-2 has been modified will be described with reference to FIGS. 3, 4A, 4B, 4C, 5A, and 5B.

As described above, according to an embodiment, in a state in which the second visual object 160-2 representing the second virtual object 130-2 is displayed, the first electronic device 101-1 may identify the visual object 172 that has been browsed by the first user 110-1 of the first electronic device 101-1 as a representation of the second user 110-2 corresponding to the second virtual object 130-2. For example, the first electronic device 101-1 may obtain information indicating the visual object 172 from the external electronic device 120. Based on identifying the visual object 172 different from the second visual object 160-2 displayed through the display from the information, the first electronic device 101-1 may display the visual object 172 together with the second visual object 160-2. The first electronic device 101-1 may display to the first user 110-1 a representation of the second user 110-2 at another timing before the current timing together with a representation (e.g., an avatar and/or a video) of the second user 110-2 at the current timing, by displaying the second visual object 160-2 and the visual object 172. The other timing may be the last time when the first user 110-1 communicates with the second user 110-2 through the first electronic device 101-1.

Hereinafter, referring to FIG. 2, according to an embodiment, an example of a structure of hardware included in the electronic device 101 and the external electronic device 120 will be described.

Figure 2:
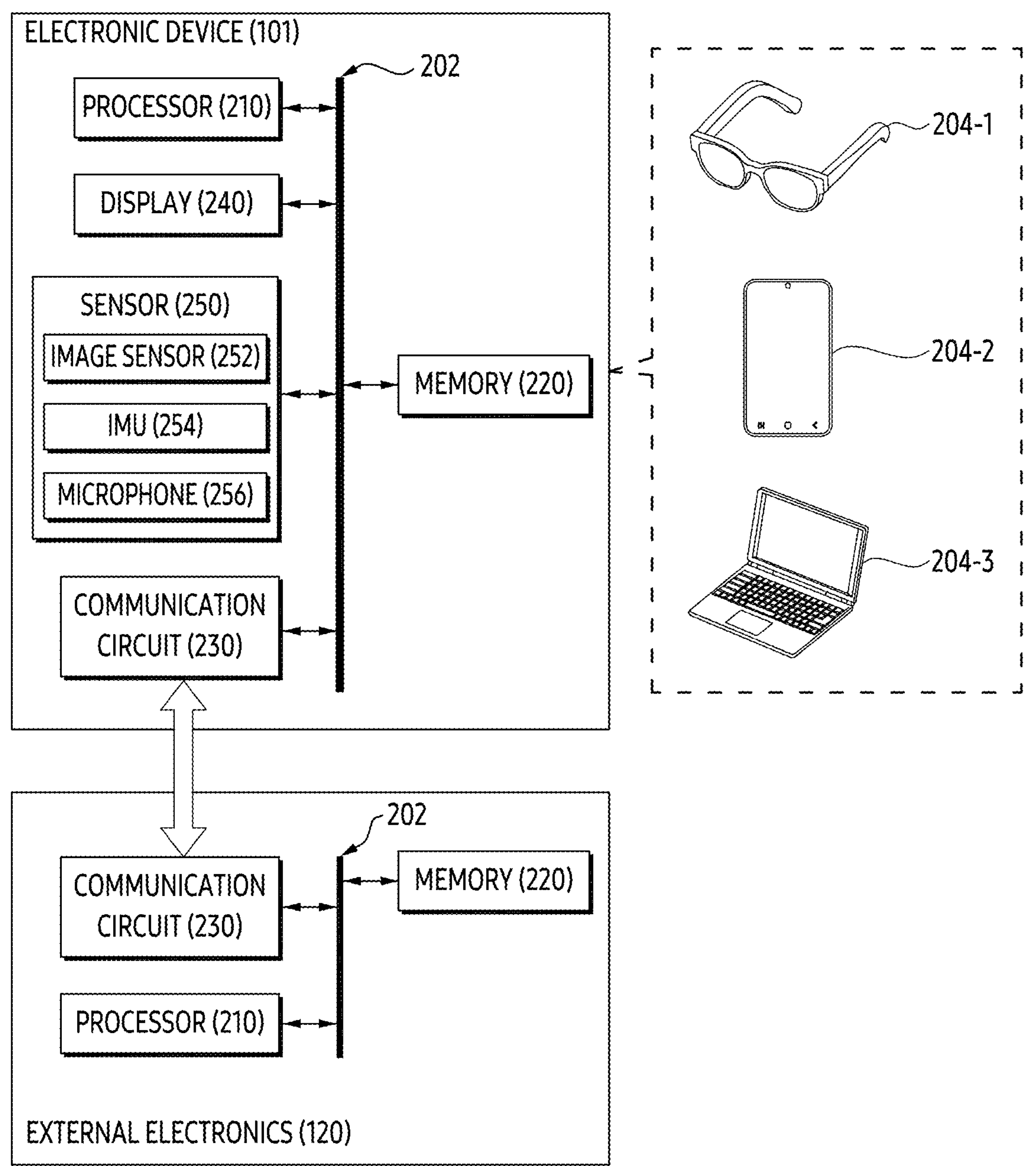
FIG. 2 is a block diagram of an electronic device according to an embodiment.

FIG. 2 is a block diagram of an electronic device 101 according to an embodiment. The electronic device 101 and an external electronic device 120 of FIG. 2 may include the electronic device 101 and the external electronic device 120 of FIG. 1.

Referring to FIG. 2, the electronic device 101 may include at least one of a processor 210, a memory 220, a communication circuit 230, a display 240, and a sensor 250. The processor 210, the memory 220, the communication circuit 230, the display 240, and the sensor 250 may be electronically and/or operably coupled with each other by an electronical component such as a communication bus 202. Hereinafter, operably coupled hardware may mean that a direct connection or indirect connection between hardware is established wired or wirelessly to ensure that the first of the hardware is controlled by the second hardware. Although illustrated based on different blocks, the embodiment is not limited thereto, and a portion of the hardware (e.g., at least a portion of the processor 210, the memory 220, and the communication circuit 230) illustrated in FIG. 2 may be included in a single integrated circuit like a system on a chip (SoC). The type and/or number of hardware included in the electronic device 101 is not limited as shown in FIG. 2. For example, the electronic device 101 may include only a part of the hardware shown in FIG. 2.

Referring to FIG. 2, appearances of the electronic device 101 are exemplarily illustrated. The electronic device 101 may have a shape of a glasses 204-1 that can be worn on the head of a user (e.g., the user 110 of FIG. 1). The electronic device 101 may have a shape of a mobile phone 204-2. The electronic device 101 may have a shape of a laptop PC 204-3.

According to an embodiment, the processor 210 of electronic device 101 may include a circuit for processing data based on one or more instructions. For example, the hardware component for processing data may include an arithmetic and logic unit (ALU), a floating point unit (FPU), a field programmable gate array (FPGA), and/or a central processing unit (CPU). The number of the processors 210 may be one or more. For example, the processor 210 may have a structure of a multi-core processor such as a dual core, a quad core, or a hexa core.

According to an embodiment, the memory 220 of the electronic device 101 may include a hardware for storing data and/or instructions input and/or output to and from the processor 210. For example, the memory 220 may include a volatile memory such as random-access memory (RAM) and/or a non-volatile memory such as read-only memory (ROM). For example, the volatile memory may include at least one of dynamic RAM (DRAM), static RAM (SRAM), Cache RAM, or pseudo SRAM (PSRAM). For example, the nonvolatile memory may include at least one of programmable ROM (PROM), erasable PROM (EPROM), electrically erasable PROM (EEPROM), flash memory, hard disk, compact disk, or embedded multi-media card (eMMC).

According to an embodiment, one or more instructions (or commands) indicating a calculation and/or an operation to be performed on data by the processor 210 may be stored in the memory 220. A set of one or more instructions may be referred to as firmware, operating system, process, routine, sub-routine, and/or application. For example, when a set of a plurality of instructions deployed in the form of operating system, firmware, driver, and/or application is executed, the electronic device 101 and/or the processor 210 may perform at least one of the operations of FIGS. 7, 8, and 9. Hereinafter, the fact that the application is installed in the electronic device 101 may indicate that one or more instructions provided in the form of the application are stored in the memory 220 of the electronic device 101, and mean that the one or more applications are stored in an executable format (e.g., a file having an extension designated by the operating system of the electronic device 101) by the processor 210 of the electronic device 101.

According to an embodiment, the communication circuit 230 of the electronic device 101 may include hardware for supporting transmission and/or reception of an electrical signal between the electronic device 101 and the external electronic device 120. Although only one external electronic device 120 connected to the electronic device 101 through the communication circuit 230 is illustrated, the embodiment is not limited thereto, and for example, the electronic device 101 may communicate with a plurality of external electronic devices including the external electronic device 120. The communication circuit 230 may include, for example, at least one of a MODEM, an antenna, and an optic/electronic (O/E) converter. The communication circuit 230 may support transmission and/or reception of an electrical signal based on various types of protocols such as Ethernet, local area network (LAN), wide area network (WAN), wireless fidelity (Wi-Fi), Bluetooth, Bluetooth low energy (BLE), ZigBee, long term evolution (LTE), and 5G new radio (NR).

According to an embodiment, the display 240 of the electronic device 101 may output visualized information (e.g., at least one of screens of FIGS. 3, 4A, 4B, 4C, 5A, 5B, and/or 6) to a user. For example, the display 240 may be controlled by a controller such as a graphical processing unit (GPU) to output visualized information to the user. The display 240 may include a flat panel display (FPD) and/or an electronic paper. The FPD may include a liquid crystal display (LCD), a plasma display panel (PDP), and/or one or more light emitting LEDs. The LED may include an organic LED (OLED).

According to an embodiment, the sensor 250 of the electronic device 101 may generate electrical information that can be processed by the processor 210 and/or the memory 220 from non-electronic information related to the electronic device 101. Referring to FIG. 2, as an example of the sensor 250, an image sensor 252, an inertial measurement unit (IMU) 254, and/or a microphone 256 are illustrated. The embodiment is not limited thereto. For example, according to an embodiment, at least one of the sensors 250 illustrated in FIG. 2 may be omitted. According to an embodiment, the sensor 250 may additionally include a sensor not shown in FIG. 2. For example, the sensor 250 may further include a global positioning system (GPS) sensor for detecting a geographic location of the electronic device 101.

According to an embodiment, the image sensor 252 of the electronic device 101 may include one or more optical sensors (e.g., charged coupled device (CCD) sensor, complementary metal oxide semiconductor (CMOS) sensor) that generate an electrical signal indicating a color and/or brightness of light. A plurality of optical sensors included in the image sensor 252 may be disposed in a form of a two-dimensional array. The image sensor 252 may generate two-dimensional frame data corresponding to light reaching optical sensors of a two-dimensional array by substantially simultaneously obtaining the electrical signal of each of the modification optical sensors. For example, the photographic data captured by using the image sensor 252 may indicate one image obtained from the image sensor 252. For example, the video data captured by using the image sensor 252 may indicate a sequence of a plurality of images obtained according to a frame rate specified by the image sensor 252. In an embodiment in which the electronic device 101 includes the image sensor 252, the number of image sensors included in the electronic device 101 may be multiple. In an embodiment in which the electronic device 101 has a form of glasses 204-1, the electronic device 101 may include a first image sensor disposed toward the eye of the user wearing the glasses 204-1, and a second image sensor disposed toward the direction (e.g., forward) in which the user's head is directed.

According to an embodiment, the IMU 254 of the electronic device 101 may include an acceleration sensor, a gyro sensor, a geomagnetic sensor, or a combination thereof. The acceleration sensor may output an electrical signal indicating gravity acceleration and/or acceleration of each of a plurality of axes (e.g., x-axis, y-axis, and z-axis) perpendicular to each other and based on a specified origin in the electronic device 101. According to an embodiment, the gyro sensor may output an electrical signal indicating an angular velocity of each of the plurality of axes. According to an embodiment, the geomagnetic sensor may output an electrical signal indicating the size of a magnetic field formed in the electronic device 101 along each of the plurality of axes (e.g., x-axis, y-axis, and/or z-axis). For example, the acceleration sensor, the gyro sensor, and/or the geomagnetic sensor may repeatedly output sensor data including the accelerations, angular velocities, and/or magnetic field sizes of the number of the plurality of axes based on a specified period (e.g., 1 millisecond).

According to an embodiment, the electronic device 101 may include a microphone 256 that outputs an electrical signal indicating vibration of the atmosphere. For example, the electronic device 101 may output an audio signal including a user's speech by using the microphone 256. The user's speech included in the audio signal may be converted into information in a format recognizable by the electronic device 101 based on a voice recognition model and/or a natural language understanding model. For example, the electronic device 101 may recognize a user's speech to execute one or more functions among a plurality of functions that may be provided by the electronic device 101.

Although not illustrated, the electronic device 101 according to an embodiment may include an output means for outputting information in a form other than a visualized form. For example, the electronic device 101 may include a speaker for outputting an acoustic signal. For example, the electronic device 101 may include a motor for providing haptic feedback based on vibration.

Referring to FIG. 2, the external electronic device 120 may include at least one of a processor 210, a memory 220, and a communication circuit 230. In the external electronic device 120, the processor 210, the memory 220, and the communication circuit 230 may be electronically and/or operably coupled with each other by an electronic component such as a communication bus 202. In the electronic device 101 and the external electronic device 120, hardware (e.g., the processor 210, the memory 220, and/or the communication circuit 230) performing similar functions may be illustrated based on a matched reference number. Description of the hardware included in each of the electronic device 101 and the external electronic device 120 may be omitted to reduce repetition of description.

According to an embodiment, the external electronic device 120 may relay the exchange of information between users and/or the users' electronic devices (e.g., the electronic device 101) by using a virtual space (e.g., the virtual space 140 in FIG. 1). The external electronic device 120 may track and/or monitor interaction between users occurring in the virtual space. In the virtual space provided by the external electronic device 120, interaction between users may be generated by avatars corresponding to each of the users (e.g., the first virtual object 130-1 and/or the second virtual object 130-2 in FIG. 1). The external electronic device 120 may store information for displaying avatars of users accessing the virtual space in the memory 220 of the external electronic device 120. The information for displaying the avatar may be referred to as account information and/or user information of the user corresponding to the avatar. The account information and/or the user information may include information (e.g., identification (ID), password, personal identification number (PIN), and/or biometric information) for authenticating a user corresponding to the avatar.

In an embodiment, based on identifying the interaction of users in the virtual space, the external electronic device 120 may store first states of virtual objects corresponding to the users in the first timing in which the interaction occurred in the memory 220 of the external electronic device 120. The first states of the virtual objects may indicate external appearances of the virtual objects in the first timing. Based on re-identifying the interaction of the users after the first timing, the external electronic device 120 may compare the first states of the virtual objects in the second timing in which the interaction occurred again with the first states stored in the memory 220. The external electronic device 120 may transmit a signal including a difference between the first states and the second states to at least one electronic device 101 among the users. The electronic device 101 receiving the information may visualize the difference included in the signal in the display 240. For example, the electronic device 101 may display the visual object 170 of FIG. 1.

According to an embodiment, the electronic device 101 may display a first visual object representing a user in the display 240 based on information received from the external electronic device 120. The user may include another user interacting with the user of the electronic device 101 through the virtual space provided by the external electronic device 120. For example, the information obtained by the electronic device 101 from the external electronic device 120 may include an interaction history between the user corresponding to the first visual object and a user of the electronic device within the virtual space. The electronic device 101 may identify the number of times that the first visual object is displayed through the display 240 based on the information received from the external electronic device 120. The electronic device 101 may identify the number of times that the first visual object has been browsed by the user of the electronic device 101 through the display 240 from the information.

In an embodiment, based on identifying the number of times lower than a preset number of times (e.g., 1 time), the electronic device 101 may display a second visual object representing the user before the first visual object together with the first visual object in the display 240. For example, when the first visual object is first displayed in the display 240 as a representation of the user corresponding to the first visual object, the electronic device 101 may display the second visual object in the display 240. For example, the second visual object may be a visual object displayed through the display 240 as a representation of a user corresponding to the first visual object. The electronic device 101 may visualize a history in which a user's representation corresponding to the first visual object is modified by simultaneously displaying the first visual object and the second visual object.

As described above, according to an embodiment, in a state of displaying a visual object representing another user connected to the user of the electronic device 101 through the virtual space provided by the external electronic device 120, the electronic device 101 may identify whether the visual object is first displayed as a representation of the other user. When the visual object is first displayed as a representation of the other user, the electronic device 101 may display another visual object displayed as the representation of the other user together with the visual object. For example, the electronic device 101 may display a current appearance of another person displayed through the display 240 in parallel with the past appearance (e.g., another appearance displayed through the display 240) of the other person.

Hereinafter, referring to FIG. 3, according to an embodiment, an example of a UI in which the electronic device 101 simultaneously displays a current appearance and a past appearance of another person displayed through the display 240 will be described.

Figure 3:
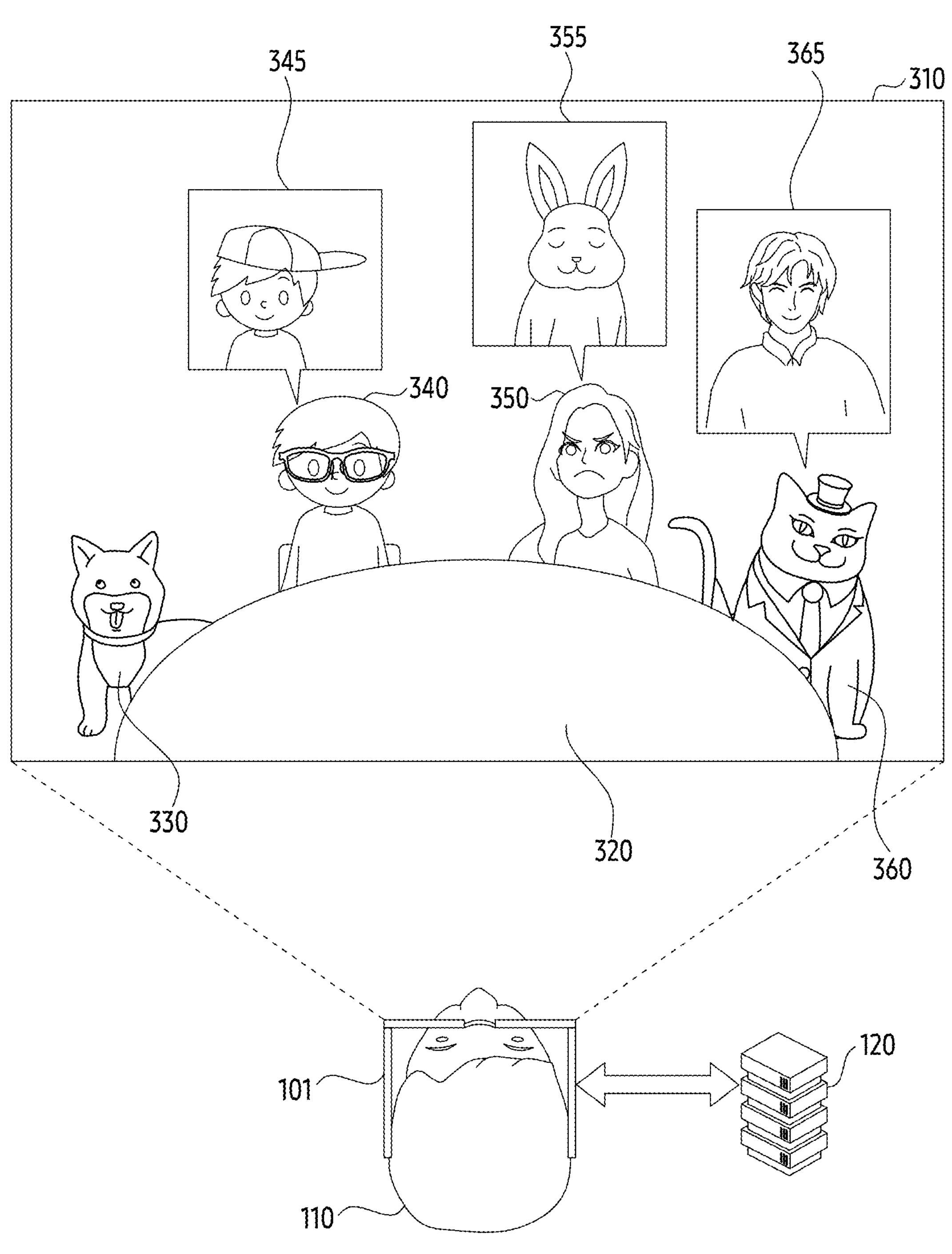
FIG. 3 illustrates an example of an operation in which an electronic device displays at least a portion of a virtual space, according to an embodiment.

FIG. 3 illustrates an example of an operation in which an electronic device 101 displays at least a portion of a virtual space, according to an embodiment. The electronic device 101 and the external electronic device 120 of FIG. 3 may be examples of the electronic device 101 and the external electronic device 120 of FIG. 2.

Referring to FIG. 3, according to an embodiment, an example in which the electronic device 101 displays visual objects 320, 330, 340, 345, 350, 355, 360, and 365 in the screen 310 is illustrated. When the electronic device 101 has an appearance of glasses (e.g., glasses 204-1 in FIG. 2) that can be worn on the head of user 110, the electronic device 101 may project the screen 310 of FIG. 3 on the lens of the glasses. Since the screen 310 is projected onto the lens, the user may browse the screen 310 together with ambient light passing through the lens. The embodiment is not limited thereto, and the electronic device 101 may have a structure for blocking the ambient light. The electronic device 101 having a structure for blocking the ambient light may provide a user experience based on video see through (VST), by displaying the screen 310 based on virtual reality (VR) or synthesizing the screen 310 including visual objects 320, 330, 340, 345, 350, 355, 360, and 365 on an image including the ambient light.

According to an embodiment, the electronic device 101 may display at least a portion of a virtual space (e.g., the virtual space 140 of FIG. 1) provided by the external electronic device 120. The electronic device 101 may display the screen 310 including at least a portion of the virtual space based on identifying an input indicating entry into the virtual space from the user 110. For example, the electronic device 101 may display the screen 310 in response to an input indicating entry into a conference room or a chat room provided by the external electronic device 120. The screen 310 may include at least a portion of a virtual space corresponding to the conference room or the chat room related to the input.

Referring to FIG. 3, an example in which the electronic device 101 displays one or more visual objects (e.g., visual objects 320, 330, 340, 345, 350, 355, 360, and 365) included in at least a portion of the virtual space is illustrated. The electronic device 101 may display the one or more visual objects based on information received from the external electronic device 120. When the electronic device 101 is connected to the external electronic device 120 based on the account information of the user 110, the electronic device 101 may receive the information for displaying at least a portion of the virtual space included in the view angle of the avatar disposed in the virtual space by the account information, from the external electronic device 120. The visual objects 320, 330, 340, 345, 350, 355, 360, and 365 included in the screen 310 of FIG. 3 may correspond to virtual objects included in the viewing angle of the avatar corresponding to the user 110 among a plurality of virtual objects disposed in the virtual space.

Referring to FIG. 3, the electronic device 101 may display a visual object 320 representing at least a portion of an object (e.g., a table) disposed in the virtual space in the screen 310. The electronic device 101 may display the visual object 320 in the screen 310 based on at least a portion of the object shown through a viewing angle of the avatar corresponding to the user 110 in the virtual space. The electronic device 101 may display visual objects 330, 340, 350, and 360 included in a viewing angle of the avatar corresponding to the user 110 in the virtual space and representing virtual objects of other users different from the user 110.

For example, the electronic device 101 may display visual objects 330, 340, and 360 corresponding to at least a portion of avatars of the other users in the screen 310. For example, visual objects 330, 340, and 360 may correspond to at least a portion of avatars of the other users, which is shown through a viewing angle of the avatar corresponding to the user 110. The embodiment is not limited thereto, and the electronic device 101 may display the visual object 350 in the screen 310 based on the video received from the external electronic device 120. For example, the video may be streamed from a camera of the user's electronic device (e.g., the second electronic device 101-2 of FIG. 1) corresponding to the visual object 350.

According to an embodiment, the electronic device 101 may identify whether the representations of the users is modified based on a history indicating users corresponding to each of the visual objects 330, 340, 350, and 360. For example, when the user corresponding to the visual object 330 first interacts with the user 110 of the electronic device 101 through the virtual space of the external electronic device 120, the electronic device 101 may not display a history in which an avatar corresponding to the visual object 330 is modified in the screen 310. The external electronic device 120 and/or the electronic device 101 may store the visual object 330 displayed in the screen 310 and/or the avatar corresponding to the visual object 330 as a history displaying the user corresponding to the visual object 330. For another example, when identifying that the visual object 330 and/or the avatar corresponding to the visual object 330 are displayed before displaying the screen 310, the electronic device 101 may not display a history in which the avatar corresponding to the visual object 330 is modified in the screen 310.

Referring to FIG. 3, when an avatar corresponding to the visual object 340 is modified by a user corresponding to the visual object 340 and/or the avatar, the electronic device 101 may display a visual object 345 representing an avatar before being modified by the user, together with the visual object 340. In the visual object 345, the electronic device 101 may display an image and/or video representing at least a portion of the avatar that was last browsed by user 110. The electronic device 101 may display information for describing timing in which the avatar was last browsed by the user 110, together with the image and/or the video within the visual object 345. The information may include a timestamp for timing and/or a location in a virtual space in which the avatar was disposed within the timing. An exemplary operation of displaying the information in the visual object 345 by the electronic device 101 will be described with reference to FIGS. 4A, 4B, 4C and/or FIGS. 5A and 5B.

Referring to FIG. 3, when a history representing an avatar corresponding to a user of the other electronic device exists before the visual object 350 including a video streamed from the other electronic device different from the electronic device 101, the electronic device 101 may display a visual object 355 including the avatar in the screen 310. For example, the electronic device 101 may reproduce at least a portion of a video of the current timing of the user corresponding to the visual object 350, in the screen 310 using the visual object 350, while the electronic device 101 displays at least a portion (e.g., a thumbnail) of a video of a past timing of the user corresponding to the visual object 355. Also, when a history of streaming video from the user's electronic device corresponding to the visual object 360 exists before the avatar corresponding to the visual object 360, the electronic device 101 may display a visual object 365 including at least a portion of the video on the screen 310. For example, the electronic device 101 may display at least a portion (e.g., a thumbnail) of a video of a past timing of the user corresponding to the visual object 360, in the screen 310 using the visual object 365.

Referring to FIG. 3, an embodiment in which the electronic device 101 displays visual objects 345, 355, and 365 having a form of a bubble is illustrated, but the embodiment is not limited thereto. The electronic device 101 may further display information of a user corresponding to the bubble within the bubble. The information may include, for example, data (e.g., the time stamp indicating the timing and/or the location of the virtual space interacting with the user in the timing) on timing on the last interaction with the user through a virtual space. As shown on the screen 310, exemplary operations in which the electronic device 101 displays representations of the user at different timings (e.g., current timings and past timings) associated with (or linked with) each other will be described with reference to FIGS. 5A and 5B. For example, the first representation of the user at the first timing (e.g., current timing) may be arranged in the screen 310 with respect to the second representation of the user at the second timing (e.g., past timing). An operation in which the electronic device 101 visualizes a modified history in representations (e.g., visual objects 330, 340, 350, and 360) of users to be displayed through the virtual space before displaying the screen 310 including at least a portion of the virtual space will be described with reference to FIGS. 4A, 4B, and 4C.

Referring to FIG. 3, in a state in which the screen 310 is displayed, the electronic device 101 may identify whether the user 110 has browsed one or more visual objects included in the screen 310. For example, the electronic device 101 may identify one visual object focused on the user 110 among visual objects displayed on the screen 310, based on at least one of a direction of eyes of the user 110, a direction of a head of the user 110, a direction of a preset body part of the user 110 such as a hand, or a speech of the user 110. For example, the electronic device 101 may identify an input indicating to browse the visual object 340 and/or the visual object 345 by tracking the direction of the eyes of the user 110. For example, the electronic device 101 may identify the input based on whether the direction of the eyes of the user 110 is stopped on the visual object 340 by exceeding a preset number of times for gazing at the visual object 340 and/or a preset duration of time on the visual object 340. For example, the electronic device 101 may identify an input indicating selection of the visual object 345 (e.g., a finger pointing toward the visual object 345). An example of an operation of the electronic device 101 identifying the input will be described with reference to FIG. 6.

In an embodiment, in response to an input indicating to browse the visual object 340 and/or visual object 345, the electronic device 101 may cease displaying the visual object 345. In response to the input, the electronic device 101 may store the visual object 340 and/or a state of the avatar corresponding to the visual object 340 as an interaction history between a user 110 and a user corresponding to the visual object 340. Based on the input, the electronic device 101 may transmit a signal indicating that the visual object 340 has been browsed by the user 110 of the electronic device 101 to the external electronic device 120. Based on the signal, the external electronic device 120 may store the visual object 340 and/or the state of the avatar corresponding to the visual object 340 in information including the interaction history.

As described above, according to an embodiment, the electronic device 101 may display a screen 310 including at least a portion of a virtual space provided by the external electronic device 120. In the screen 310, the electronic device 101 may display visual objects 330, 340, 350, and 360 indicating different users interacting with the user 110 of the electronic device 101 through the virtual space. Each of the visual objects 330, 340, 350, and 360 may be representations (e.g., avatar, photo IDs, and/or video including user) of the users accessing the virtual space in the current timing. The electronic device 101 may visualize a history in which the representation of the users are modified. For example, the electronic device 101 may display visual objects (e.g., visual objects 345, 355, and 365) different from the visual objects 330, 340, 350, and 360 and including a user's representation displayed through the electronic device 101 before the current timing, in the screen 310.

Hereinafter, referring to FIGS. 4A, 4B, and 4C and/or FIGS. 5A and 5B, according to an embodiment, an example of an operation in which the electronic device 101 visualizes a history in which a virtual object included in the virtual space is modified will be described.

Figure 4A:
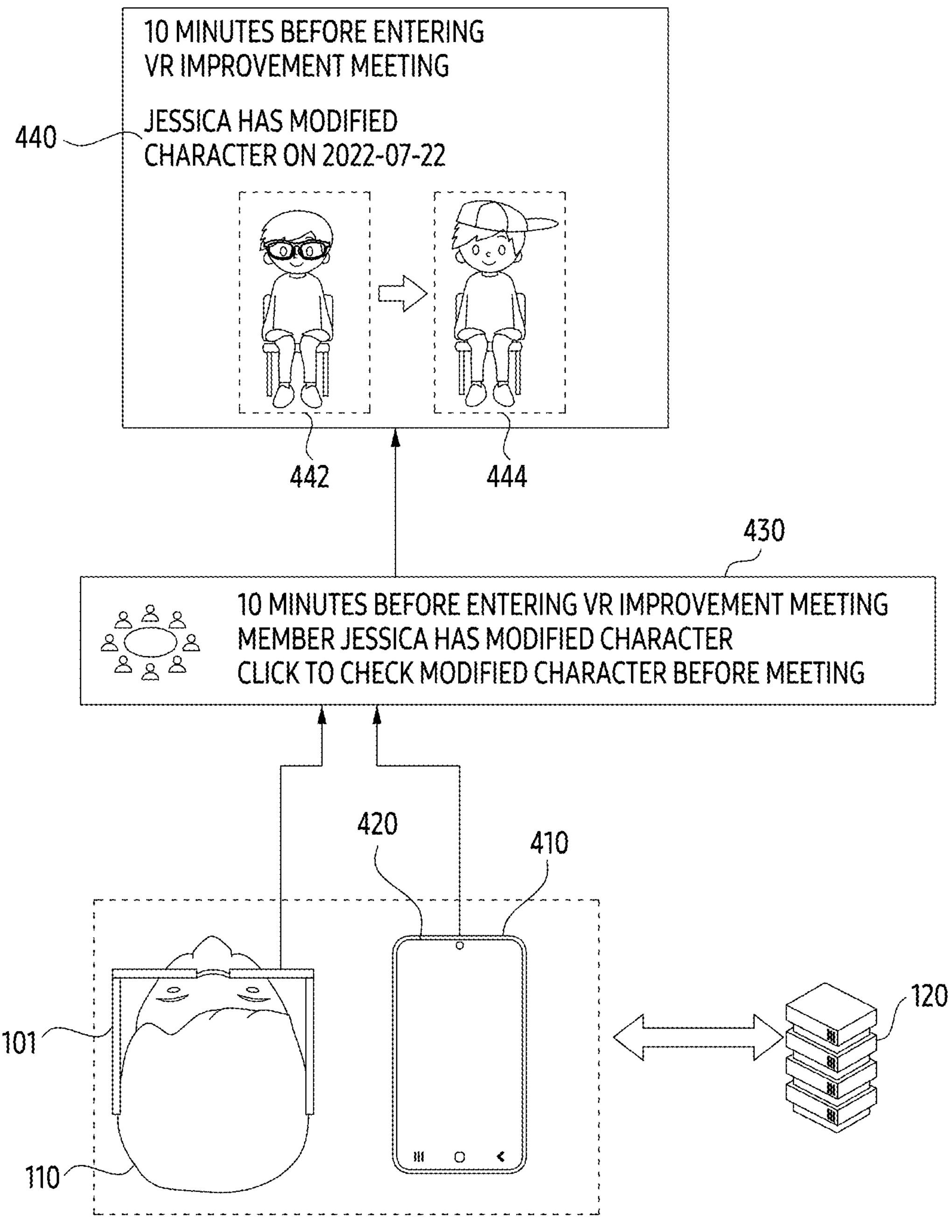
FIGS. 4A, 4B, and 4C illustrate an example of an operation in which an electronic device displays a visual object representing a virtual object, according to an embodiment.
Figure 4B:
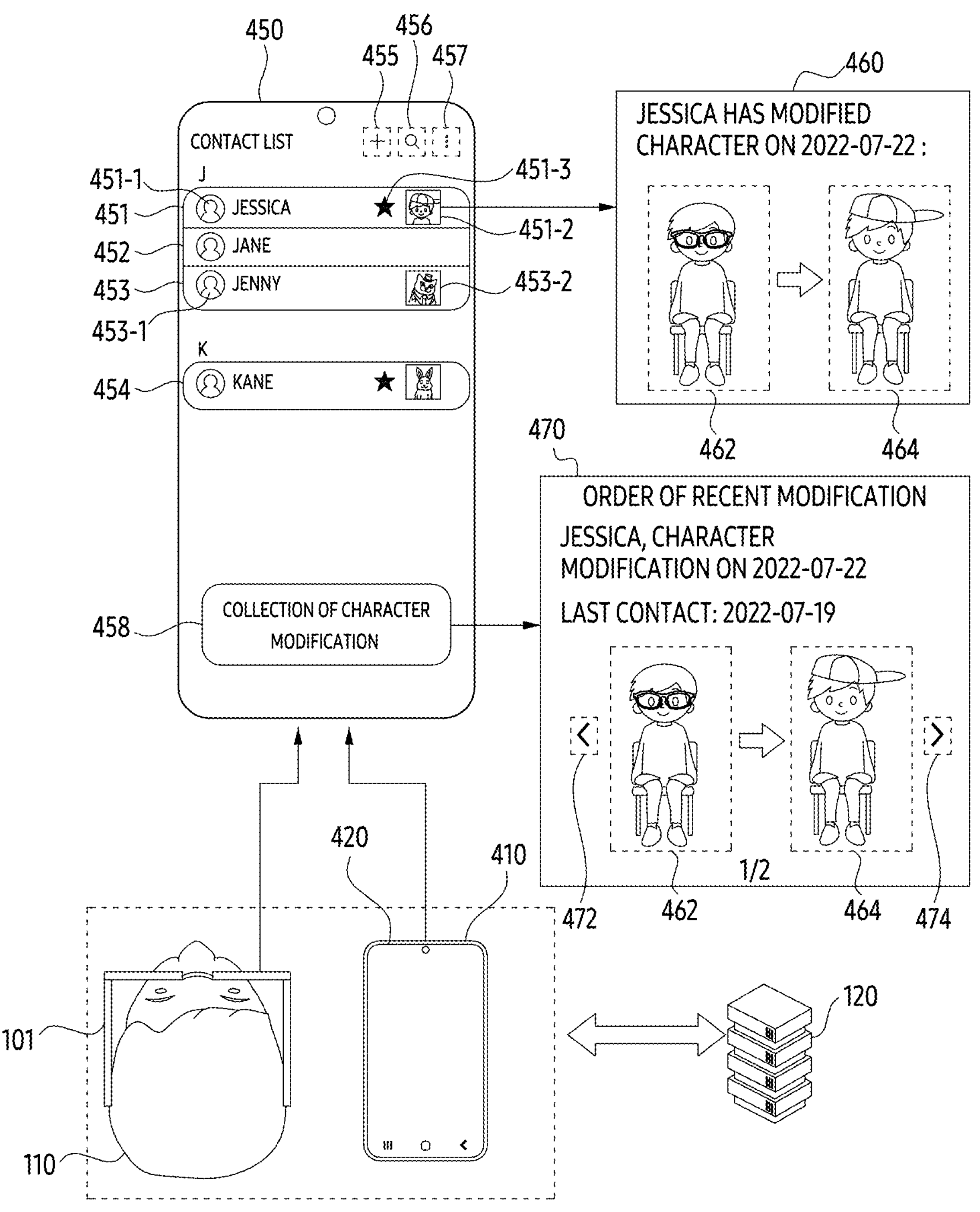
Figure 4C:
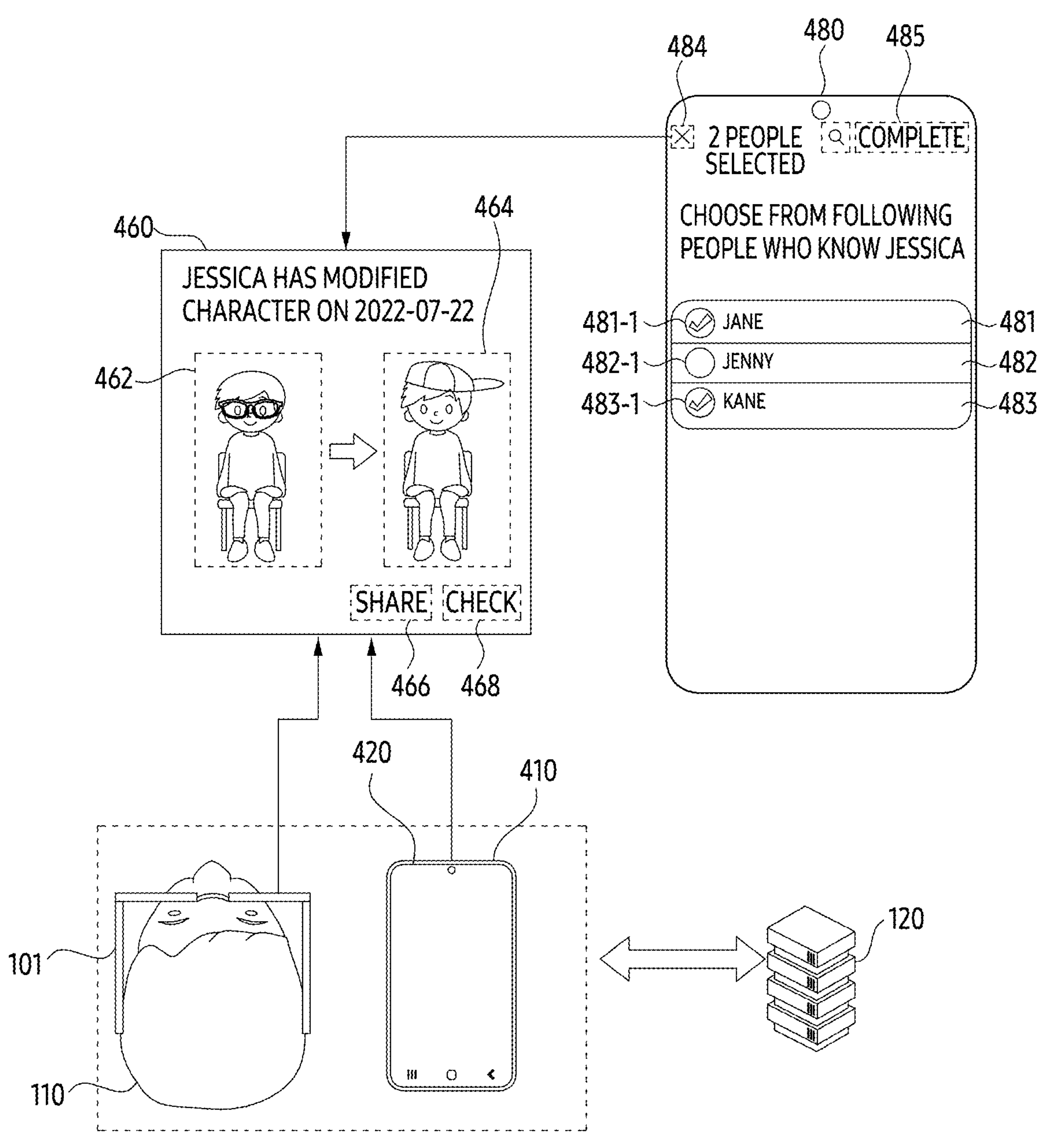

FIGS. 4A, 4B, and 4C illustrate an example of an operation in which an electronic device 101 displays a visual object representing a virtual object, according to an embodiment. The electronic devices 101 and 410 of FIGS. 4A, 4B, and 4C may include the electronic devices 101 of FIGS. 1, 2, and 3. The electronic device 101 and the electronic device 410 may be terminals of the user 110. For example, the electronic device 101 and the electronic device 410 may communicate with the external electronic device 120 based on the account information of the user 110. Although an embodiment in which the electronic device 101 has the appearance of glasses and the electronic device 410 has the appearance of a mobile phone (e.g., the mobile phone 204-2 of FIG. 2) is illustrated, the embodiment is not limited thereto.

According to an embodiment, the electronic device 101 and/or the electronic device 410 may access a virtual space (e.g., the virtual space 140 of FIG. 1) provided by the external electronic device 120 based on the account information of the user 110. The external electronic device 120 may provide a service (e.g., a metaverse service and/or a video conference service) for conversation of physically spaced users based on the virtual space. For example, the external electronic device 120 may reserve video conferences of a plurality of users including the user 110 based on the virtual space. The reservation of the video conference may be generated by information received from at least one of the plurality of users. The external electronic device 120 may store information indicating reservation of the video conference in a memory (e.g., the memory 220 of FIG. 2) of the external electronic device 120. The information may include information indicating a timing at which the video conference will be initiated and/or a location in a virtual space where the video conference will be generated.

In an embodiment, before the timing indicated by the information, the external electronic device 120 may transmit a message (e.g., a push notification) for guiding access to the virtual space based on the reservation to the electronic devices of the plurality of users indicated by the information. The external electronic device 120 may be referred to as a push server in terms of transmitting a push notification. When the wearing of the electronic device 101 by the user 110 is identified, the external electronic device 120 may selectively transmit the message to the electronic device 101 among the electronic device 101 and the electronic device 410. The embodiment is not limited thereto, and the external electronic device 120 may transmit the message to at least one of the electronic device 101 and/or the electronic device 410 independently of whether the user 110 wears the electronic device 101.

Referring to FIG. 4A, in response to the message received from the external electronic device 120, an example of a visual object 430 displayed by the electronic device 101 and/or the electronic device 410 is illustrated. The electronic device 101 may display the visual object 430 in a field-of-view (FoV) of the user 110 wearing the electronic device 101 through a display (e.g., the display 240 of FIG. 2). The electronic device 410 may display the visual object 430 based on the message on the display 420. Referring to FIG. 4A, the electronic device 101 and/or the electronic device 410 may display a timing in which a video conference based on a virtual space will be initiated and/or an assigned title to the video conference, such as text within visual object 430 (e.g., "10 minutes before entering VR Improvement Conference").

Referring to FIG. 4A, in the visual object 430, the electronic device 101 and/or the electronic device 410 may display text (e.g., "member Jessica has modified the character. Click to check the modified characters before the meeting") to guide that representations of other users different from the user 110 are modified among users who will attend the video conference corresponding to the message. In the visual object 430, the electronic device 101 and/or electronic device 410 may display a nickname ("Jessica" in an embodiment of FIG. 4A) of a user whose avatar is modified. Using the text displayed through the electronic device 101 and/or the electronic device 410, the external electronic device 120 may guide the user 110 that a representation of at least one of the other users has been modified.

Referring to FIG. 4A, the electronic device 410 may display the visual object 440 in response to a gesture of touching and/or clicking the visual object 430 displayed in the display 420. The electronic device 101 may identify an input indicating that the visual object 430 is selected based on the gaze of a user 110 wearing the electronic device 101 and/or the user's gesture. The electronic device 101 may display the visual object 440 to the user 110 in response to the input.

Referring to FIG. 4A, in the visual object 440 having a form of a bubble, the electronic device 101 and/or the electronic device 410 may display a history in which representations of one or more users are modified. In the visual object 440, the electronic device 101 and/or the electronic device 410 may display text (e.g., "Jessica changes character on 2022 Jul. 22") including the timing in which the avatar of the other user is modified. In the visual object 440, the electronic device 101 and/or the electronic device 410 may display a history in which an avatar of another user distinguished from the user 110 is modified by using visual objects 442 and 444. The visual objects 442 and 444 may be an image visualizing at least a portion of an avatar of the other user in different timings. The visual object 442 may correspond to a state of the avatar last browsed by the user 110 of the electronic device 101, and the visual object 444 may correspond to a state of the avatar to be displayed through a video conference related to the visual object 440. For example, the visual object 442 may indicate an avatar that was displayed to the user 110 through another video conference performed before the video conference, thereby the visual object 442 represents the avatar at a past time or past state.

In an embodiment, the electronic device 101 and/or the electronic device 410 may display a history in which the avatar is modified based on a contact list stored in the electronic device 101 and/or the electronic device 410. Referring to FIG. 4B, an embodiment in which the electronic device 101 and/or the electronic device 410 displays a screen 450 including a contact list is illustrated. In the screen 450, the electronic device 101 and/or the electronic device 410 may display items 451, 452, 453, and 454 corresponding to each of a plurality of users stored in the contact list. Each of the items 451, 452, 453, and 454 may include a corresponding user's name and/or a picture. When the user included in the contact list has an avatar visualized by account information stored in the external electronic device 120, the electronic device 101 and/or the electronic device 410 may display an image of at least a portion of the avatar in the screen 450 including the contact list.

For example, the electronic device 101 and/or the electronic device 410 may display a visual object 451-2 representing an avatar matching the user in the item 451, together with the user's name (e.g., "Jessica") corresponding to the item 451, and the user's photo 451-1. Similarly, the electronic device 101 and/or the electronic device 410 may display a visual object 453-2 representing an avatar matching the user in item 453, together with the user's name (e.g., "Jenny") corresponding to item the 453, and the user's photo 453-1. Referring to visual object 453-2 and/or visual object 451-2, the electronic device 101 and/or the electronic device 410 may display an image and/or video representing at least a portion of the avatar (e.g., a portion including the face of the avatar) in the screen 450.

Referring to FIG. 4B, the electronic device 101 and/or the electronic device 410 may display options for adding and/or searching the contact list in the screen 450 including the contact list. For example, the electronic device 101 and/or the electronic device 410 may display a visual object 455 having a form of the button and for adding a user to the contact list, in the screen 450. The electronic device 101 and/or the electronic device 410 may display a visual object 456 for searching for at least one user in the contact list and having a form of the button, in the screen 450. The electronic device 101 and/or the electronic device 410 may display a visual object 457 for displaying options different from the visual objects 455 and 456 in the screen 450.

Referring to FIG. 4B, according to an embodiment, the electronic device 101 and/or the electronic device 410 may identify a history in which an avatar of a user included in the contact list is modified based on the information received from the external electronic device 120. The electronic device 101 and/or the electronic device 410 may display an indicator indicating that the avatar is modified based on the history in the screen 450. For example, when the user's avatar corresponding to item 451 is modified, the electronic device 101 and/or the electronic device 410 may display a visual object 451-3 for notifying that the avatar is modified in the item 451 displayed in the screen 450. Although the visual object 451-3 having the appearance of a star is exemplarily illustrated, the embodiment is not limited thereto. The display of visual object 451-3 may indicate that the user's representation corresponding to the item 451 is modified, after the interaction of the user 110 of the electronic device 101 and/or the electronic device 410 and a user corresponding the item 451. Referring to FIG. 4B, when the avatar of the user corresponding to the item 453 is not modified, the electronic device 101 and/or the electronic device 410 may refrain from displaying an indicator such as the visual object 451-3 in the item 453.

Referring to FIG. 4B, in response to an input indicating that an item 451 including an indicator such as a visual object 451-3 is selected in the contact list, the electronic device 101 and/or the electronic device 410 may display a visual object 460 for guiding a history in which an avatar of a user corresponding to the item 451 is modified. The visual object 460 may be displayed in the display 420 of the electronic device 410, or may be displayed to the user 110 wearing the electronic device 101, in a form of a pop-up window. In the visual object 460, the electronic device 101 and/or the electronic device 410 may display a history in which a user's avatar corresponding to visual object 460 is modified by using visual objects 462 and 464. Similar to the visual objects 442 and 444 of FIG. 4A, the electronic device 101 and/or the electronic device 410 may visualize states of the avatars at different timings using the visual objects 462 and 464. For example, the visual object 464 corresponding to the visual object 451-2 in the screen 450 may represent the current state of the avatar. For example, the visual object 462 may represent an avatar last browsed by the user 110 as a past state of the avatar.

According to an embodiment, the electronic device 101 and/or the electronic device 410 may display a pop-up window summarizing a history in which avatars of users included in the contact list are modified. Referring to FIG. 4B, an example in which the electronic device 101 and/or the electronic device 410 displays a visual object 470 in the form of the pop-up window is illustrated. In response to an input indicating selection of a button (e.g., the visual object 458) for guiding the display of the visual object 470 within the screen 450, the electronic device 101 and/or the electronic device 410 may display the visual object 470. In the visual object 470, the electronic device 101 and/or the electronic device 410 may display a list of one or more avatars having different states browsed by the user 110 among avatars of the users included in the contact list. Referring to an embodiment of FIG. 4B, in the visual object 470, the electronic device 101 and/or the electronic device 410 may display the visual objects 462 and 464 obtained by visualizing a history in which an avatar of a user corresponding to the item 451 is modified. In the visual object 470, the electronic device 101 may display visual objects 472, 474 for changing the history of modification of the avatar of one user in the visual object 470 to another history of modification of an avatar of another user.

According to an embodiment, the electronic device 101 and/or the electronic device 410 may execute a function for sharing a history in which the avatar of the user included in the contact list is modified to another user different from the user 110. Referring to FIG. 4C, in the visual object 460, the electronic device 101 and/or the electronic device 410 may display a button (e.g., the visual object 466) for executing the function. In the visual object 460, the electronic device 101 and/or the electronic device 410 may display a button (e.g., the visual object 468) for ceasing the display of the visual object 460 in FIG. 4C. Although an embodiment based on the visual object 460 of FIG. 4B is described, the electronic device 101 and/or the electronic device 410 may display the button for executing the function in the visual object 440 of FIG. 4A and the visual object 470 of FIG. 4B.

Referring to FIG. 4C, in response to an input indicating a selection of a visual object 466, the electronic device 101 and/or the electronic device 410 may display a pop-up window (e.g., the visual object 480) for sharing a history in which an avatar related to the visual object 460 is modified. In the visual object 480, the electronic device 101 and/or the electronic device 410 may display a list of at least one user who has browsed the avatar displayed through the visual object 460. For example, users corresponding to each of the items 481, 482, and 483 displayed in the visual object 480 may be users who have seen the avatar visualized through the visual object 460 through the electronic device, among users stored in the contact list of the electronic device 101 and/or the electronic device 410. For example, based on the history displayed through electronic devices of users corresponding to each of the items 481, 482, and 483, the avatar in the state related to the visual object 462 may display items 481, 482, and 483 in the electronic device 101 and/or the electronic device 410. The electronic device 101 and/or the electronic device 410 may identify the history based on information transmitted from the external electronic device 120.

According to an embodiment, the electronic device 101 and/or the electronic device 410 may display check boxes 481-1, 482-1, and 483-1 for selecting each of the items 481, 482, and 483 within the items 481, 482, and 483, respectively. Referring to FIG. 4C, an exemplary state after identifying inputs indicating selection of check boxes 481-1 and 483-1 from among check boxes 481-1, 482-1, and 483-1 from the user 110 is illustrated. In the visual object 480, the electronic device 101 and/or the electronic device 410 may display a button (e.g., the visual object 484) for stopping a display of the visual object 480. In the visual object 480, the electronic device 101 and/or the electronic device 410 may display a button (e.g., the visual object 485) for sharing a history in which an avatar related to the visual object 460 is modified, to at least one user selected by the inputs within the visual object 480. In response to an input indicating that visual object 485 is selected within the state illustrated in FIG. 4C, the electronic device 101 and/or the electronic device 410 may transmit information indicating the history to electronic devices of users corresponding to items 481 and 483 corresponding to the check boxes 481-1 and 483-1, respectively, thereby allowing the users corresponding to the check boxes 481-1 and 483-1 to display the visual object 462 of the avatar in the past state and display the visual object 464 of the avatar in the current state.

As described above, according to an embodiment, the electronic device 101 and/or the electronic device 410 may visualize a history in which the representation of another user distinguished from the user 110 is modified based on the information received from the external electronic device 120. For example, the electronic device 101 and/or the electronic device 410 may visualize a history in which an avatar is modified in a virtual space (e.g., the virtual space 140 of FIG. 1) matching the other user. As described above with reference to FIG. 4A, timing in which the electronic device 101 and/or the electronic device 410 visualizes the history may include timing before browsing the avatar through a virtual space provided by the external electronic device 120. As described above, referring to FIGS. 4B and 4C, the electronic device 101 and/or the electronic device 410 may visualize the history based on the contact list. In a state of visualizing the history, as shown visual objects 462 and 464 in FIGS. 4B and 4C, the electronic device 101 and/or the electronic device 410 may display visual objects representing states of avatars of different timings. The timings may include a first timing that is a current timing and a second timing of a time browsing the avatar before the current timing. Based on the visual objects, the electronic device 101 and/or the electronic device 410 may visualize a change in avatars between the timings.

Hereinafter, referring to FIGS. 5A and 5B, according to an embodiment, an example of an operation in which the electronic device 101 visualizes a history in which a representation of a user (e.g., another user distinguished from the user 110 of the electronic device 101) is modified within a screen (e.g., the screen 310 of FIG. 3) including a portion of a virtual space provided by the external electronic device 120 will be described.

Figure 5A:
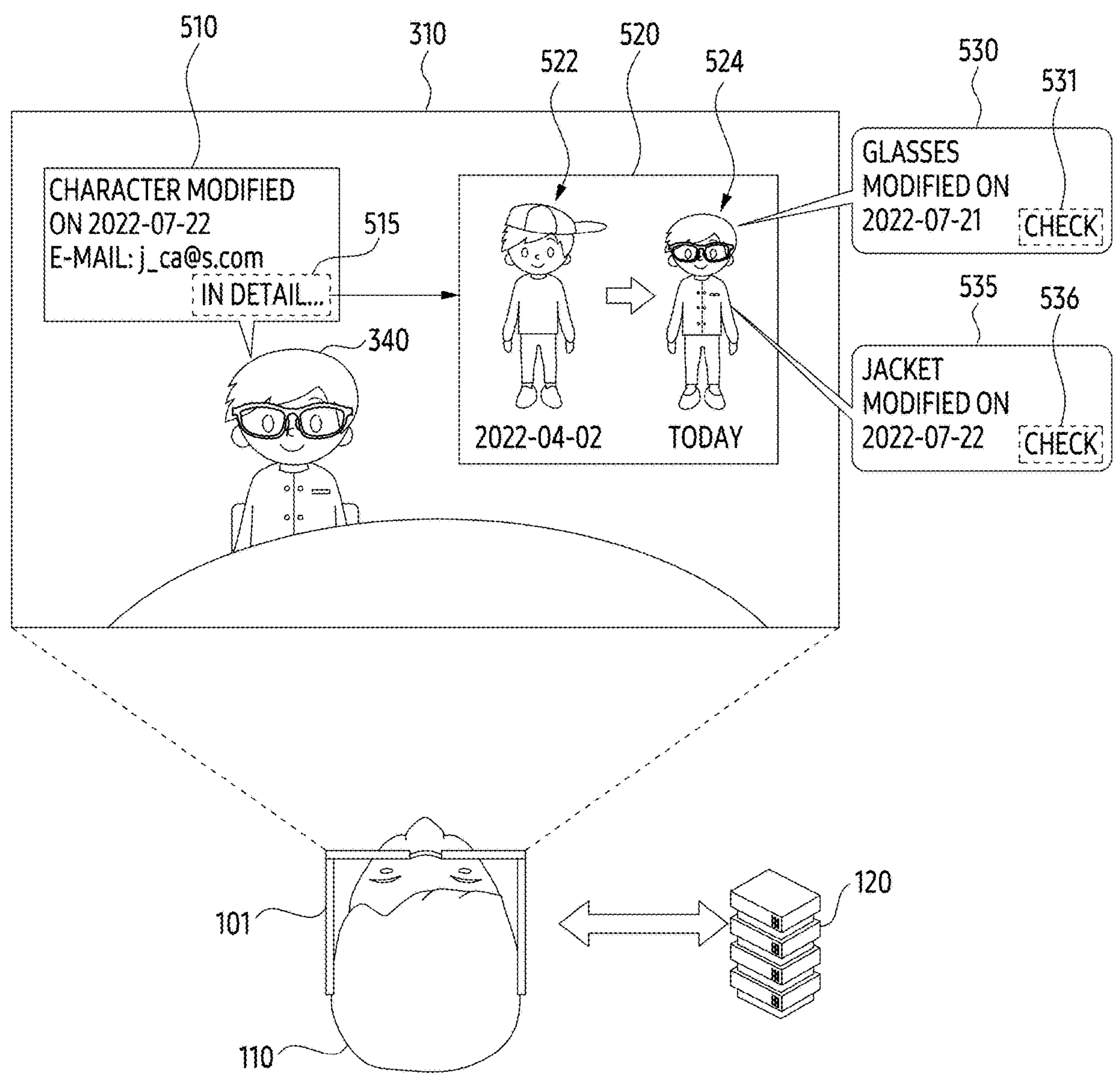
FIGS. 5A and 5B illustrate an example of an operation in which an electronic device displays a visual object based on a modification history of a virtual object, according to an embodiment.
Figure 5B:
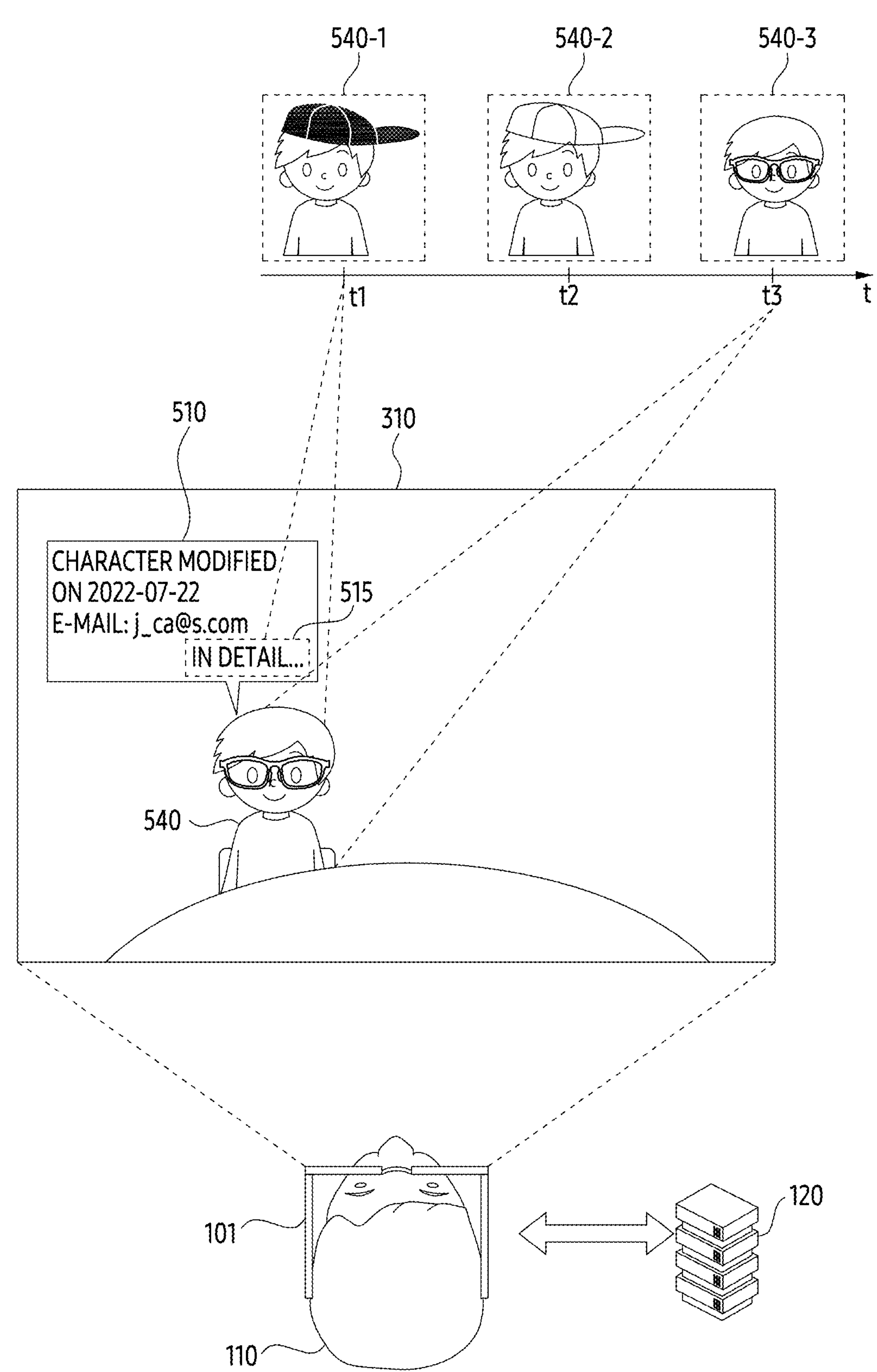

FIGS. 5A and 5B illustrate an example of an operation in which an electronic device 101 displays a visual object based on a modification history of a virtual object, according to an embodiment. The electronic device 101 and the external electronic device 120 of FIGS. 5A and 5B may include the electronic device 101 and the external electronic device 120 of FIGS. 1, 2, and 3, and/or FIGS. 4A, 4B, and 4C.

Referring to FIG. 5A, according to an embodiment, the electronic device 101 may display at least a portion of the virtual space in the screen 310 based on information transmitted from the external electronic device 120. At least a portion of the virtual space displayed through the screen 310 may be a portion of the virtual space included in a viewing angle of the avatar of the user 110. The electronic device 101 may display a visual object 340 representing a virtual object in the screen 310. The electronic device 101 may display the visual object 340 in the screen 310 based on identifying the virtual object within the viewing angle of avatar of the user 110. The virtual object corresponding to the visual object 340 may be a representation (e.g., an avatar) of another user different from the user 110. The visual objects 340 of FIGS. 5A and 5B may include the visual object 340 of FIG. 3.

According to an embodiment, the electronic device 101 may visualize a history in which a virtual object corresponding to the visual object 340 is modified in the screen 310. For example, the electronic device 101 may display a history in which an avatar corresponding to the visual object 340 is modified together with the visual object 340. For example, the electronic device 101 may visualize a history in which a representation of a user (e.g., another user distinguished from the user 110) matched to the visual object 340 is modified. Referring to FIG. 5A, the electronic device 101 may display a visual object 510 including a history in which an avatar corresponding to the visual object 340 is modified, together with the visual object 340 in the screen 310. Although the visual object 510 in a form of a bubble is exemplarily illustrated, the embodiment is not limited thereto.

According to an embodiment, the electronic device 101 may display the visual object 510 for visualizing history of the avatar corresponding to the visual object 340, based on whether an identifier (e.g., ID) is displayed within the screen 310 which is uniquely assigned to the avatar. For example, when the identifier is displayed at a position in the screen 310 adjacent to the visual object 340, the user 110 browsing the screen 310 may recognize counterpart corresponding to the visual object 340 based on the identifier. When the identifier is displayed together with the visual object 340, the electronic device 101 may not display the visual object 510 for visualizing history of the avatar. In an embodiment, instead of not displaying the visual object 510, the electronic device 101 may display an indicator (e.g., a dot having a preset color such as red) indicating modification of the avatar in a position in the screen 310 adjacent to the visual object 340.

According to an embodiment, the electronic device 101 may determine whether to display the visual object 510 for visualizing history of the avatar based on a source of the avatar corresponding to the visual object 340. For example, if the avatar is generated by using a 3-dimensional shape of a face of the user 110, the electronic device 101 may not display the visual object 510. For example, if the information associated with the avatar includes a preset parameter (or a flag) indicating that the avatar was generated based on a shape of a face of the user 110, the electronic device 101 may refrain from displaying the visual object 510.

According to an embodiment, when information related to an avatar corresponding to the visual object 340 is stored in the electronic device 101, the electronic device 101 may display at least a portion of the information related to the avatar in the visual object 510. Referring to FIG. 5A, the electronic device 101 may display a name (e.g., "Jessica") of the user corresponding to the avatar, timing (e.g., "Change the character on 2022 Jul. 22") when the avatar is modified, and/or personal information (e.g., email address such as "j_ca@s.com") of the user as at least a portion of the information displayed in the visual object 510. The personal information displayed by the electronic device 101 within the visual object 510 may include personal information disclosed by the user corresponding to the visual object 340. For example, the electronic device 101 may display any of the personal information in the visual object 510 based on Table 1.

TABLE 1

| Types of Personal Information | Value |
|---|---|
| Name | off |
| Nick name | on |
| Photo (photo ID) | off |
| Avatar Modification History | on |
| Interactions History in virtual space | on |
| Schedule Information | off |
| Extra Personal Information (e.g., Age, Job, Address, phone number, Email Address) | on (Email Address) |

The value of Table 1 may be set by the user of the avatar corresponding to the visual object 340. Referring to Table 1, the electronic device 101 may display at least a portion of personal information (e.g., nickname, avatar modification history, interaction history in virtual space, and email address) having a first preset value (e.g., "on") in the visual object 510. The electronic device 101 may refrain from displaying personal information having a second preset value (e.g., "off") different from the first preset value among the user's personal information in the visual object 510. The embodiment is not limited thereto, and the external electronic device 120 may selectively transmit personal information having the first preset value, among the personal information of the user, to the electronic device 101. Similarly, the electronic device 101 may obtain a value from the user 110 for adjusting a range of personal information to be displayed with a history in which the avatar of user 110 is modified.

Based on the personal information exemplarily listed in Table 1, the electronic device 101 may distinguish and display avatars corresponding to different users with a matched name. The electronic device 101 may distinguish the users by displaying photo IDs corresponding to the users together with visual objects representing the avatars.

Referring to FIG. 5A, the electronic device 101 may display a button for visualizing a history in which an avatar related to the visual object 340 is modified in the visual object 510. Referring to FIG. 5A, as an example of the button, a visual object 515 having preset text such as "in detail" is exemplarily illustrated. In response to an input indicating that the visual object 515 is selected, the electronic device 101 may display a pop-up window (e.g., the visual object 520) for guiding the history of the avatar in the screen 310.

Referring to FIG. 5A, the electronic device 101 may display visual objects 522 and 524 representing states of the avatar within the visual object 520 in association with each other at different timings. For example, the electronic device 101 may display the visual object 522 representing the state of the avatar at a timing in which the avatar was browsed by the user 110 before the current timing. The electronic device 101 may display text (in an example of FIG. 5A, "2022 Apr. 2") for guiding the timing together with the visual object 522. The electronic device 101 may display the visual object 524 representing the state of the avatar of the current timing together with the visual object 522. The electronic device 101 may visualize the order in which the avatar is modified using an arrow (e.g., an arrow from the visual object 522 to the visual object 524) disposed between the visual objects 522 and 524.

In an embodiment, the avatar displayed by the electronic device 101 may have a combined form of a virtual object representing clothing (or garment) (e.g., top, bottom, shoes, gloves, and/or accessories such as hat). The electronic device 101 may visualize a history in which one or more clothes coupled to the avatar corresponding to the visual object 340 are modified within the visual object 520. For example, the electronic device 101 may identify a history in which one or more clothes coupled to the avatar corresponding to the visual object 340 are modified from information obtained from the external electronic device 120. The electronic device 101 may identify a history in which one or more clothes coupled to the avatar are modified by comparing information for displaying the visual objects 522 and 524. The electronic device 101 may visualize a history in which the one or more clothes are modified together with the visual object 520. The embodiments are not limited thereto, the electronic device 101 may modify, after generating the avatar by using an image (or a video) such as a first photograph, at least portion of the avatar by using a second photograph different from the first photograph. For example, the electronic device 101 may modify at least portion of the avatar by using modification of a body (or garment) of a specific user which is recognized by comparing the first photograph and the second photograph with respect to the specific user. The electronic device 101 according to an embodiment may visualize a history in which at least portion of the avatar is modified.

Referring to FIG. 5A, in an exemplary case in which glasses and a top are newly coupled to an avatar related to a visual object 340, an example in which the electronic device 101 displays visual objects 530 and 535 for guiding the history in which the glasses and the top are combined is illustrated. The electronic device 101 may display visual objects 530 and 535 having a form of bubbles associated with the visual object 524. In this case, the electronic device 101 may highlight (e.g., blink) the glasses and the top in the visual object 524, independently of displaying visual objects 530 and 535. For example, the electronic device 101 may highlight the glasses and/or the top by repeatedly displaying shapes having preset transparency and preset color by overlapping the glasses and/or the top.

Referring to FIG. 5A, in the visual object 530, the electronic device 101 may display a text guiding a name (e.g., glasses) of the clothing coupled to the avatar corresponding to the visual object 524 and the timing (e.g., 2022 Jul. 1) at which the clothing is coupled to the avatar. In the visual object 530, the electronic device 101 may display a button (e.g., the visual object 531 including preset text such as "check") for stopping a display of the visual object 530. Similarly, in the visual object 535, the electronic device 101 may display a name (e.g., jacket) of the top coupled to the avatar and the timing (e.g., 2022 Jul. 22) in which the top of the avatar is replaced. Based on an input indicating that the visual object 536 is selected, the electronic device 101 may stop displaying the visual object 535. Referring to the visual objects 530 and 535 of FIG. 5A, an exemplary case in which the timing at which the avatar corresponding to the visual object 340 was last modified is Jul. 22, 2022, the timing at which the top was replaced is shown. In this case, the electronic device 101 may display a text (e.g., Jul. 22, 2022) indicating the timing in the visual object 510 of the screen 310.

In an embodiment, the electronic device 101 displaying an avatar based on a combination of a plurality of graphical objects may visualize, at a second timing after a first timing when the avatar was last displayed, a history in which the avatar is modified based on whether graphical objects exceeding a preset number has changed, added and/or deleted. Referring to FIG. 5A, at a timing between the timing (e.g., 2022 Jul. 1) at which the clothing is coupled to the avatar and the timing (e.g., 2022 Jul. 22) in which the top of the avatar is replaced, since the only one graphical object (e.g., the clothing) was changed after the timing (e.g., 2022 Apr. 2) at which the avatar was last browsed, the electronic device 101 may not display the visual object 510. For example, at a timing after the timing (e.g., 2022 Jul. 22) in which the top of the avatar is replaced, since two of graphical objects are changed after the timing (e.g., 2022 Apr. 2) at which the avatar was last browsed, the electronic device 101 may display the visual object 510.

Although an exemplary operation in which the electronic device 101 sequentially displays the visual objects 510 and 520 based on the visual object 515 is described, the embodiment is not limited thereto. For example, in case that information related to the avatar corresponding to the visual object 340 is not stored in the electronic device 101 or the information of the user corresponding to the avatar is not shared with the user 110 of the electronic device 101, the electronic device 101 may display the visual object 520 among the visual objects 510 and 520. In this example, the electronic device 101 may display the visual object 522 representing an avatar last browsed by the user 110 together with the visual object 340 representing the current state of the avatar using the visual object 520. In the example, since the user 110 has only browsed the visual object 522, the electronic device 101 may visualize a history in which the avatar of the visual object 522 is modified by displaying the visual object 522 together with the visual object 340.

For example, based on identifying the user's information related to the visual object 340 from the memory of the electronic device 101 or identifying the history in which the information is shared with the user 110, the electronic device 101 may display the visual object 510 among the visual objects 510 and 520. The information may be stored in the contact list within the electronic device 101. For example, based on identifying data indicating the user corresponding to the visual object 340 within the contact list stored in the memory of the electronic device 101, the electronic device 101 may display the visual object 510 including at least a portion of the data together with the visual object 340. At least one of the visual objects 510 and 520 may be conditionally displayed based on a history in which an avatar corresponding to the visual object 340 is modified.

According to an embodiment, within the screen 310 including at least a portion of the virtual space, visualizing the history in which an avatar is modified by the electronic device 101 is not limited to the exemplary operation of FIGS. 3 and/or 5A. Referring to FIG. 5B, in the screen 310, the electronic device 101 may display the visual object 540 representing an avatar in the virtual space provided by the external electronic device 120. In the time domain, the electronic device 101 may visualize a history in which the avatar is modified by sequentially modifying the form of the visual object 540.

Referring to FIG. 5B, in a time interval between timing t1 and timing t3, different states 540-1, 540-2, and 540-3 of the visual object 540 displayed by the electronic device 101 in the screen 310 are illustrated. The timing t1 may include a timing in which the electronic device 101 initiates to display the screen 310 in the display, or a timing after the preset period from the timing. The timing t1 may be a timing that identifies an input indicating that electronic device 101 browses the visual object 540. In the timing t1, the first state 540-1 of the visual object 540 displayed by the electronic device 101 in the screen 310 may correspond to one state of the avatar that was last browsed by the user 110, among the states of the avatar corresponding to the visual object 540. In the timing t3, the third state 540-3 of visual object 540 displayed by electronic device 101 in the screen 310 may correspond to the current state of the avatar among the states.

Referring to FIG. 5B, in the timing t2, the second state 540-2 of the visual object 540 displayed by the electronic device 101 in the screen 310 may include an intermediate state (or an intermediate form) between the first state 540-1 and the third state 540-3 of the visual object 540. Based on the intermediate state, within a time interval between the timing t1 and the timing t3, the electronic device 101 may display an animation in which the form of the visual object 540 is transformed from the first state 540-1 to the third state 540-3. The electronic device 101 may identify one or more intermediate states of the visual object 540 including the second state 540-2 based on a visual effect such as morphing.

As described above, according to an embodiment, in the screen 310 representing a portion of the virtual space, the electronic device 101 may display at least one visual object (e.g., the visual object 340) representing at least one virtual object included in the portion. In a state in which the visual object 340 representing an avatar of another user different from the user 110 is displayed in the screen 310, the electronic device 101 may visualize a history in which the avatar is modified. Visualizing the history by the electronic device 101 may be related to a difference between the first state of the avatar corresponding to the visual object 340 and the second state of the avatar last displayed through the display of the electronic device 101 prior to the visual object 340. When the first state and the second state are different, the electronic device 101 may display a visual object (e.g., the visual object 522 of FIG. 5A and/or the first state 540-1 of the visual object 540 of FIG. 5B) representing the avatar in the second state in the screen 310. Using the visual object representing the avatar in the second state, the electronic device 101 may visualize a history in which a state of the avatar is modified from the second state to the first state.

According to an embodiment, in the screen 310, the electronic device 101 may store a state of the avatar corresponding to the visual object 340 in the electronic device 101 and/or the external electronic device 120 as a state of the avatar last browsed by the user 110, based on an input indicating that the visual object 340 is browsed. The electronic device 101 may identify the input by comparing a portion of the screen 310 focused by the user 110 with a portion of the screen 310 on which the visual object 340 is displayed. Hereinafter, referring to FIG. 6, according to an embodiment, an example of an operation in which the electronic device 101 identifies a portion of the screen 310 focused by the user 110 will be described.

Figure 6:
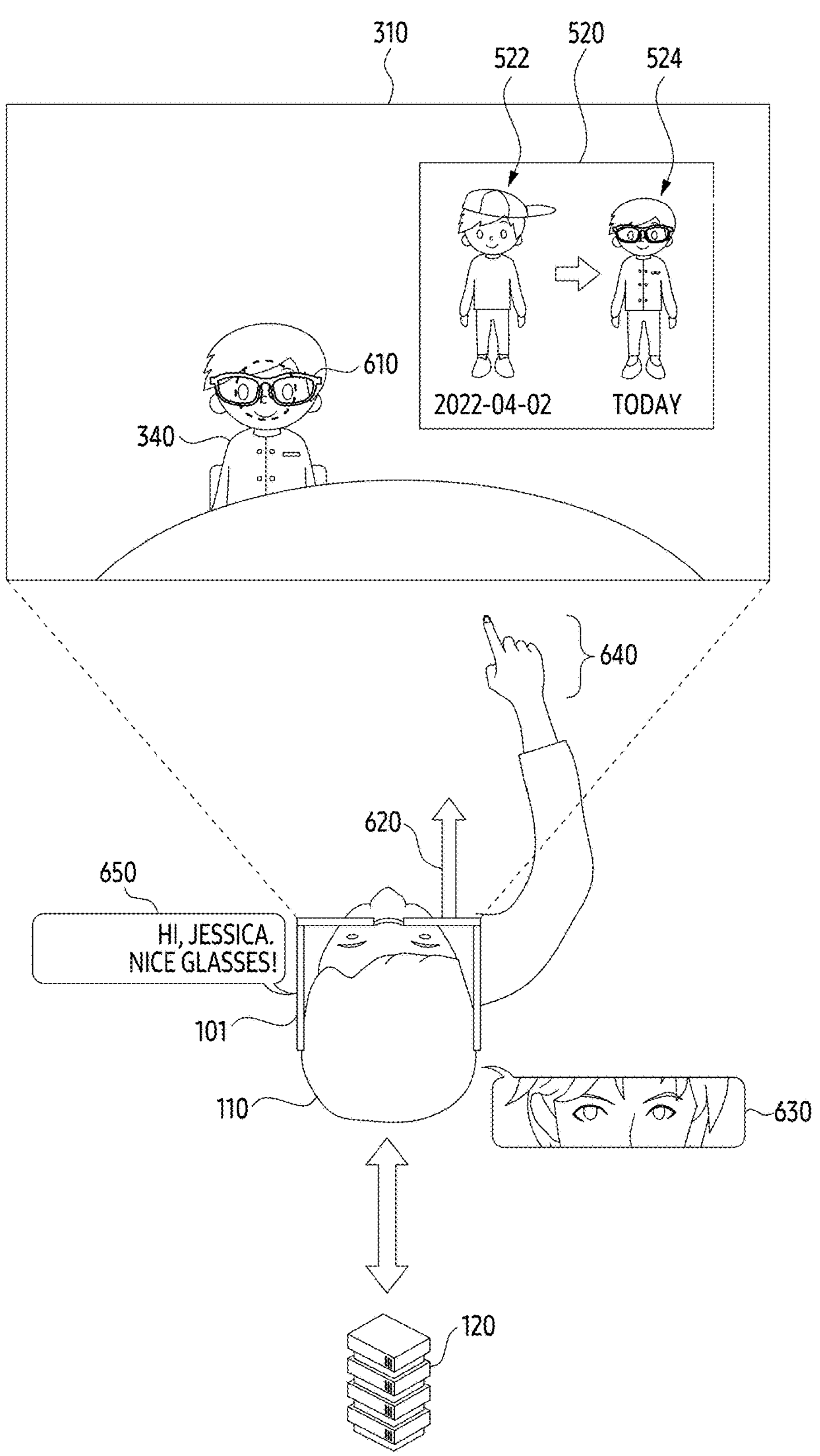
FIG. 6 illustrates an example of an operation in which an electronic device identifies an input for a visual object corresponding to a virtual object, according to an embodiment.

FIG. 6 illustrates an example of an operation in which an electronic device 101 identifies an input for a visual object 340 corresponding to a virtual object, according to an embodiment. The electronic device 101 and the external electronic device 120 of FIG. 6 may include the electronic device 101 and the external electronic device 120 of FIGS. 1 to 3, 4A to 4C, and/or 5A to 5B.

Referring to FIG. 6, according to an embodiment, an exemplary state in which the electronic device 101 displays at least a portion of a virtual space (e.g., the virtual space 140 of FIG. 1) provided by the external electronic device 120 in the screen 310 is illustrated. In a state of FIG. 6, the electronic device 101 may display the visual object 340 representing an avatar of another user different from the user 110. When the first state of the avatar corresponding to the visual object 340 is different from the second state of the avatar, which was last browsed by the user 110 or last displayed through the electronic device 101, the electronic device 101 may display the visual object 522 representing an avatar in the second state. Referring to FIG. 6, the electronic device 101 may display the visual object 520 having a form of a bubble including the visual object 522 together with the visual object 340. In the visual object 520, the electronic device 101 may visualize a history in which an appearance of the avatar is modified from the second state to the first state, by displaying the visual object 524 representing the avatar in the first state.

In the exemplary state of FIG. 6, according to an embodiment, the electronic device 101 may identify information related to the user 110 by using a sensor (e.g., the sensor 250 of FIG. 2). For example, the electronic device 101 may identify information indicating the motion of the head of the user 110 wearing the electronic device 101 based on the IMU 254 of FIG. 2. Based on the information, the electronic device 101 may identify the direction 620 of the head of the user 110. Based on the direction 620 of the head, the electronic device 101 may identify a portion 610 in the screen 310 to which the direction 620 is directed.

For example, the electronic device 101 may identify information (e.g., frames including the hand 640) indicating motion of the hand 640 based on the image sensor 252 of FIG. 2. The information related to the hand 640 may be obtained through an image sensor disposed in the electronic device 101 toward another direction opposite to one direction toward the head of the user 110. Based on the information, the electronic device 101 may identify the direction of at least one finger included in the hand 640. The electronic device 101 may identify a portion 610 in the screen 310 indicated by the at least one finger based on the direction of the at least one finger.

For example, the electronic device 101 may identify information indicating the direction of the user's gaze based on the image sensor 252 of FIG. 2. The information may include frames 630 including the user's eyes. The frames 630 may be obtained through an image sensor disposed toward the eyes of the user 110 in the electronic device 101. Based on the information, the electronic device 101 can identify the portion 610 within the screen 310 to which the user's eyes are directed. Based on identifying the direction of the gaze toward the portion where the visual object 340 is displayed within the screen 310 such as the portion 610, the electronic device 101 may identify an input indicating to browse the visual object 340. Based on identifying the input, the electronic device 101 may display a visual object (e.g., a bounding box) including at least a portion of the visual object 340 (e.g., an avatar's face represented by the visual object 340). For example, the electronic device 101 may display a visual object having a form of a preset color (e.g., yellow).

For example, the electronic device 101 may identify information indicating the user's speech 650 by using the microphone 256 of FIG. 2. The information may include an audio signal output from the microphone 256. The information may include a result (e.g., a text indicating the speech) of performing speech-to-text (STT) on the audio signal. The electronic device 101 may identify that the visual object 340 is browsed by the user 110 based on identifying a natural language sentence (e.g., "Hi Jessica") that calls the user's name ("Jessica" in an embodiment of FIG. 6) related to the visual object 340, among texts included within the information.

As shown in the examples, the electronic device 101 may identify an input indicating to browse the visual object 340, based on a direction 620 of the head of the user 110, a direction of gaze, a direction of the hand 640, and/or the speech 650 of the user 110. For example, based on the direction 620 of the head, the direction of the gaze, the direction of the hand 640, and/or the speech 650 of the user 110, the electronic device 101 may identify whether the user 110 browses the visual object 340. Based on whether the user 110 browses the visual object 340, the electronic device 101 may cease the display of the visual object 520 including the history of the avatar related to the visual object 340. For example, based on identifying the speech 650 including the name of the user corresponding to the avatar, the electronic device 101 may cease the display of the visual object 520. The embodiment is not limited thereto, and the electronic device 101 may cease the display of the visual object 520 in response to an input indicating that the visual object 520 is selected. The embodiment is not limited thereto, and the electronic device 101 may display, while the visual object 520 indicating history of the avatar corresponding to the visual object 340 is not displayed, the visual object 520 within the screen 310 in response to an input indicating to browsing the visual object 340.

For example, based on the duration and/or the number of times that the gaze direction of the user 110 identified by the frames 630 is ceased within the visual object 340, the electronic device 101 may identify whether the user 110 browses the visual object 340. For example, it may be identified whether the duration and/or number of times that the gaze direction of the user 110 is ceased within the portion 610 exceeds the preset duration and/or preset number of times. When the gaze of the user 110 ceases within the portion 610 by exceeding the preset duration and/or enters the portion 610 by exceeding the preset number of times, the electronic device 101 may cease displaying the visual object 520. Based on the preset duration and/or the number of preset times, the electronic device 101 may more accurately identify whether the user 110 browses the visual object 340.

According to an embodiment, the electronic device 101 may transmit information indicating whether the user 110 browses the visual object 340 to the external electronic device 120. For example, the electronic device 101 may transmit a head direction 620, a hand direction 640, a speech 650, and/or frames 630 to the external electronic device 120. For example, the electronic device 101 may transmit information on an input indicating to browse the visual object 340 to the external electronic device 120.

In an embodiment, the external electronic device 120 may identify whether the visual object 340 is browsed by the user 110, based on the information transmitted from the electronic device 101. When the visual object 340 is browsed by the user 110, the external electronic device 120 may store information related to the visual object 340. The information may include data for displaying an avatar corresponding to the visual object 340. The information may include data indicating a state of the avatar corresponding to the visual object 340. The information may include data indicating one or more clothes attached to the avatar. The information may include a timestamp indicating a timing in which the visual object 340 is browsed by user 110, and/or a timing in which the electronic device 101 displays the visual object 340 in the screen 310.

According to an embodiment, similar to the operation of the external electronic device 120 storing the information, the electronic device 101 may store information indicating that the visual object 340 is browsed by the user 110 in the electronic device 101. For example, the electronic device 101 may store data indicating a state of an avatar corresponding to the visual object 340. For example, the electronic device 101 may store a timestamp indicating timing for displaying the visual object 340 through the screen 310. The electronic device 101 may store data indicating one or more virtual objects corresponding to each of one or more clothing coupled to the avatar. In response to an input indicating to browse the visual object 340, an operation in which the electronic device 101 ceases displaying the visual object 520 may be performed similarly to the above-described operation with reference to FIG. 5A.

As described above, according to an embodiment, the electronic device 101 may display the visual object 340 representing another user distinguished from the user 110 by communicating with the external electronic device 120. The visual object 340 may include an image and/or a video recorded by the electronic device of the other user. The visual object 340 may correspond to at least a portion of an avatar registered in the external electronic device 120 by the other user. The electronic device 101 may display another visual object (e.g., the visual object 522) displayed through the electronic device 101 to represent the other user before the visual object 340, together with the visual object 340. By displaying the other visual objects together with the visual object 340, the electronic device 101 may visualize a history in which a virtual object (e.g., avatar, image, and/or video) representing the other user is modified to the user 110. Based on the other visual object displayed with the visual object 340, the user 110 with a history of viewing the other visual object may more quickly recognize that the visual object 340 is a representation of the other user corresponding to the other visual object.

Hereinafter, referring to FIG. 7, according to an embodiment, one or more signals exchanged by the electronic device 101 and the external electronic device 120 are described.

Figure 7:
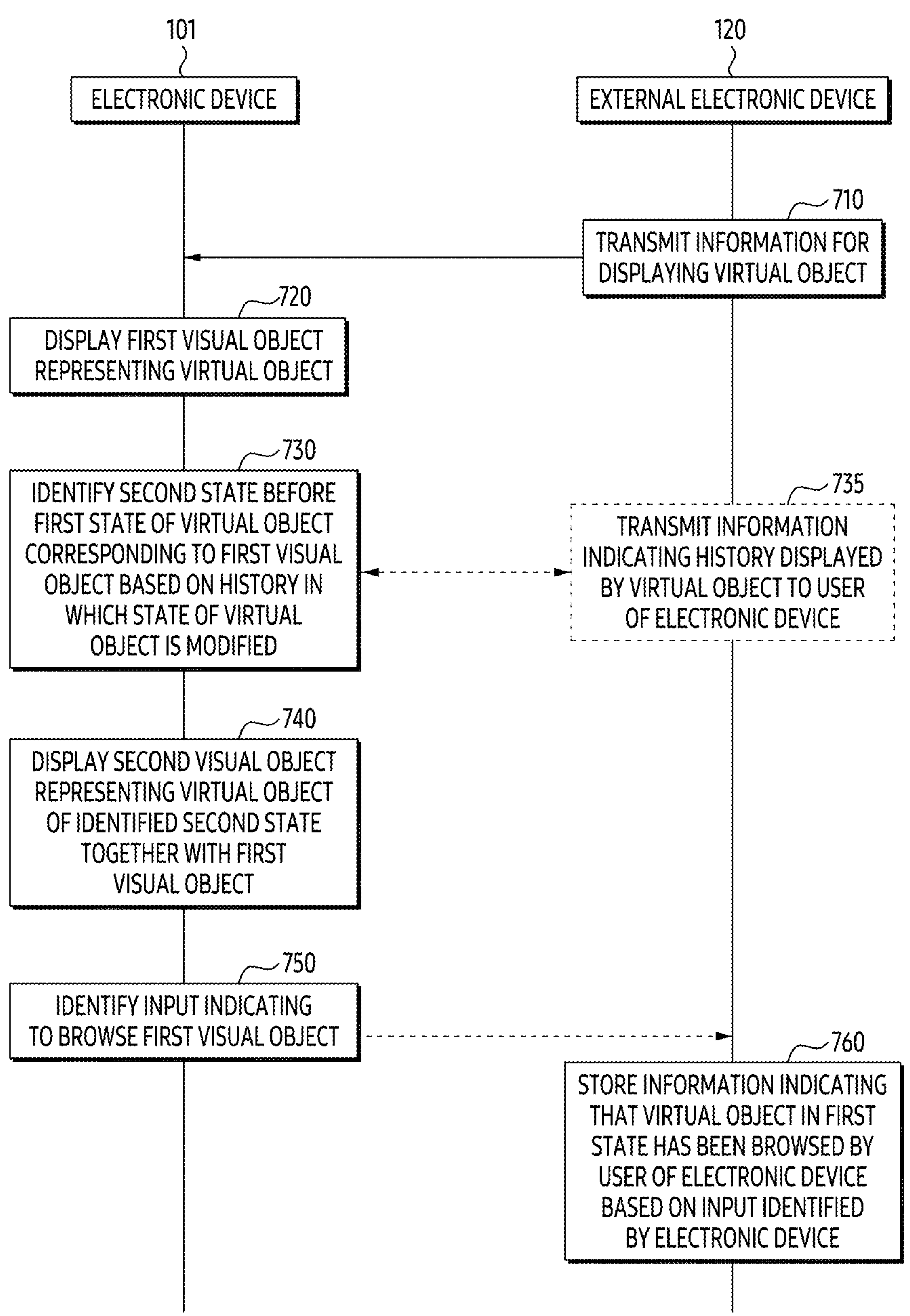
FIG. 7 illustrates an example of a signal flowchart between an electronic device and an external electronic device, according to an embodiment.

FIG. 7 illustrates an example of a signal flowchart between an electronic device 101 and an external electronic device 120, according to an embodiment. The electronic device 101 and the external electronic device 120 of FIG. 7 may include the electronic device 101 and the external electronic device 120 of FIGS. 1, 2, 3, 4A, 4B, 4C, 5A, 5B, and/or 6. The operations of the electronic device 101 of FIG. 7 may be performed by the electronic device 101 of FIG. 2 and/or the processor 210 in the electronic device 101 of FIG. 2. The operations of the external electronic device 120 of FIG. 7 may be performed by the external electronic device

120 of FIG. 2 and/or the processor 210 in the external electronic device 120 of FIG. 2.

Referring to FIG. 7, in operation 710, according to an embodiment, the external electronic device 120 may transmit information for displaying a virtual object. The external electronic device 120 may transmit the information to one or more electronic devices (e.g., the electronic device 101 of FIG. 2) connected to the external electronic device 120, through the communication circuit (e.g., the communication circuit 230 in the external electronic device 120 of FIG. 2). The information may include data for visualizing a virtual space (e.g., the virtual space 140 of FIG. 1) including one or more virtual objects. The virtual object in operation 710 may indicate a user who has accessed another electronic device different from the electronic device 101 receiving the information in operation 710. For example, the virtual object in operation 710 may include the user's avatar. For example, the virtual object in operation 710 may include an image and/or a video streamed from the other electronic device.

Referring to FIG. 7, in operation 720, according to an embodiment, the electronic device 101 may display a first visual object representing the virtual object. Based on receiving the information in operation 710, the electronic device 101 may display the first visual object representing the virtual object in operation 710. The first visual object may be related to the virtual object in the current state, such as the second visual object 160-2 of FIG. 1, the visual objects 330, 340, 350, and 360 of FIG. 3, the visual object 444 of FIG. 4A, the visual object 464 of FIGS. 4B and 4C, the visual objects 340 and 524 of FIG. 5A, and/or the visual object 540 of the third state 540-3 of FIG. 5B.

Referring to FIG. 7, in operation 730, according to an embodiment, the electronic device 101 may identify the second state before the first state of the virtual object corresponding to the first visual object based on the history in which the state of the virtual object is modified. The electronic device 101 may identify the second state based on the history stored in the electronic device 101 and/or the external electronic device 120. For example, the electronic device 101 may identify the history that displayed the user corresponding to the virtual object in the memory of the electronic device 101. For example, the electronic device 101 may request information indicating the history to the external electronic device 120. According to an embodiment, in operation 735, based on the request for the information, the external electronic device 120 may transmit information indicating a history displayed by a virtual object to a user of the electronic device. Based on the history, the electronic device 101 may identify the second state of the virtual object that has been browsed by the user of the electronic device 101 (e.g., the user 110 of FIGS. 1-6).

Referring to FIG. 7, in operation 740, according to an embodiment, the electronic device 101 may display a second visual object representing the virtual object of the identified second state together with the first visual object. When the virtual object in the second state is different from the first state of the virtual object corresponding to the first visual object in operation 720, the electronic device 101 may perform operation 740 to display the first visual object and the second visual object together. The second visual object of operation 740 may include the visual object 170 of FIG. 1, the visual objects 345, 355, and 365 of FIG. 3, the visual object 442 of FIG. 4A, the visual object 462 of FIGS. 4B and 4C, the visual object 522 of FIG. 5A, the visual object 540 of the first state 540-1 of FIG. 5B, and the visual object 522 of FIG. 6.

Referring to FIG. 7, in operation 750, according to an embodiment, the electronic device 101 may identify an input indicating to browse the first visual object. As described above with reference to FIG. 6, the electronic device 101 may identify the input based on a direction of the body part (e.g., user's head, eyes, and/or hand) of the user (e.g., the user 110 of FIG. 6) of the electronic device 101 and/or the user's speech (e.g., the speech 650 of FIG. 6). Based on identifying the input indicating to browse the first visual object, the electronic device 101 may store information indicating that the virtual object in the first state has been browsed by the user of the electronic device 101. Referring to FIG. 7, based on identifying the input, the electronic device 101 may transmit information related to the input to the external electronic device 120.

Referring to FIG. 7, in operation 760, according to an embodiment, the external electronic device 120 may store information indicating that the virtual object in the first state has been browsed by the user of the electronic device based on the input identified by the electronic device. The external electronic device 120 may perform operation 760 based on identifying information related to the input of operation 750 from the electronic device 101. Based on operation 760, the external electronic device 120 may store information indicating the first visual object of operation 720 and/or the first state of the virtual object for displaying the first visual object. The external electronic device 120 may store information indicating the first state of the virtual object as the state of the virtual object last browsed by the user of the electronic device 101. For example, when the state of the virtual object is modified after operation 760, the external electronic device 120 may transmit data on the virtual object in the modified state together with data on the virtual object in the first state to the electronic device 101.

Figure 8:
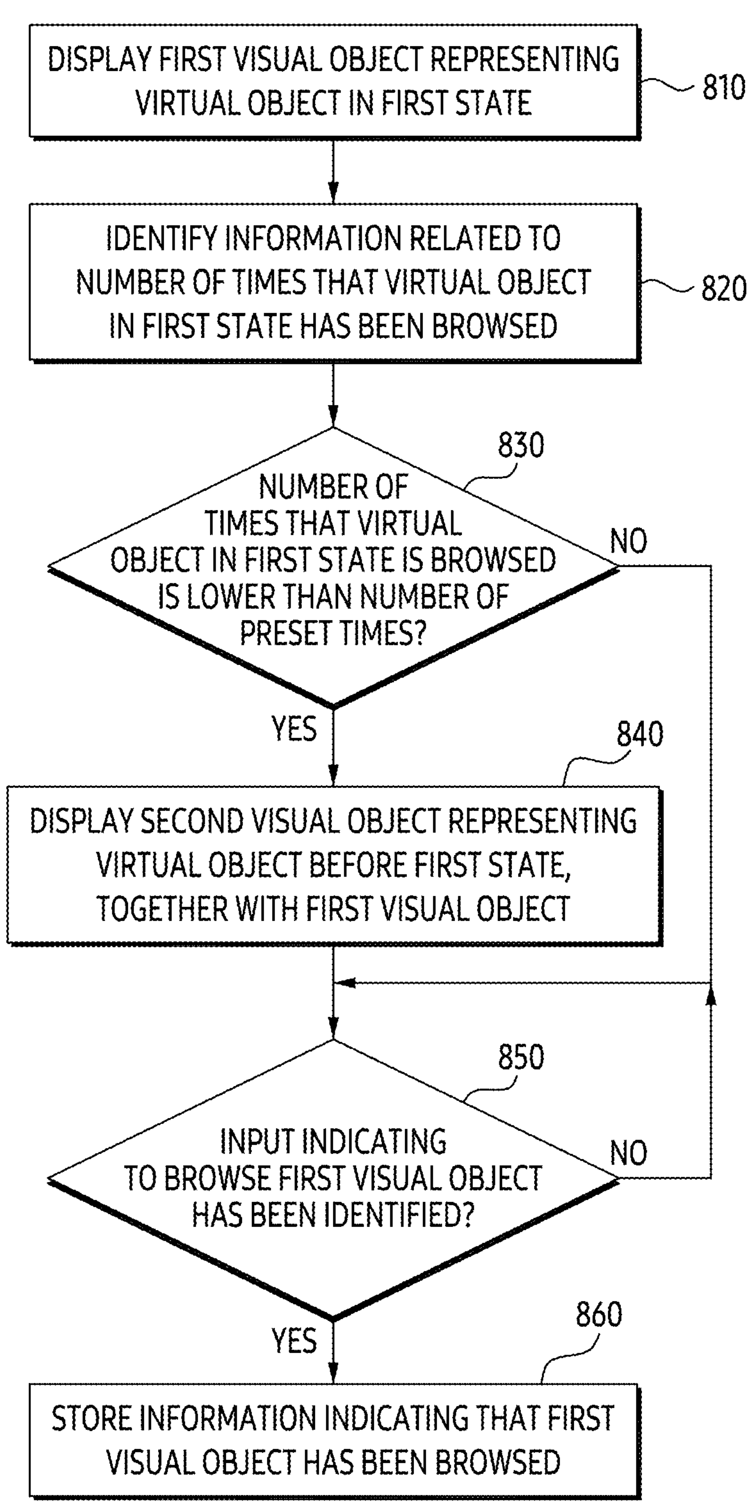
FIG. 8 illustrates an example of a flowchart of an electronic device according to an embodiment.

FIG. 8 illustrates an example of a flowchart of an electronic device according to an embodiment. The electronic device of FIG. 8 may include the electronic device 101 of FIGS. 1, 2, 3, 4A, 4B, 4C, 5A, 5B, 6, and 7. The operations of the electronic device of FIG. 8 may be performed by the electronic device 101 of FIG. 2 and/or the processor 210 in the electronic device 101 of FIG. 2. At least one of the operations of the electronic device of FIG. 8 may be related to at least one of the operations of the electronic device 101 of FIG. 7.

Referring to FIG. 8, in operation 810, according to an embodiment, the electronic device may display a first visual object representing a virtual object in the first state. The electronic device may perform operation 810 of FIG. 8, similar to operation 720 of FIG. 7. Based on receiving information related to the virtual object in the first state from an external electronic device different from the electronic device (e.g., the external electronic device 120 of FIGS. 1-7), the electronic device may display the first visual object representing the virtual object in the first state.

Referring to FIG. 8, in operation 820, according to an embodiment, the electronic device may identify information related to the number of times that the virtual object in the first state has been browsed. The electronic device may identify the information of operation 820 in a state in which the first visual object representing the virtual object of the first state is displayed based on operation 810. The information may be stored in the external electronic device in operation 810 and/or in the electronic device in operation 810. The information may include a state of the virtual object that was last browsed by a user of the electronic device. The information may include a history in which the electronic device displays the virtual object.

Referring to FIG. 8, in operation 830 according to an embodiment, the electronic device may determine whether the number of times that the virtual object in the first state is browsed is lower than the number of preset times. The number of preset times may include a number indicating whether the virtual object in the first state is first browsed by the user of the electronic device, such as the number 1.

Referring to FIG. 8, when the number of times that the virtual object in the first state is browsed is lower than the number of preset times (830—YES), the electronic device according to an embodiment may display a second visual object representing a virtual object before the first state together with the first visual object, based on operation 840. The electronic device may perform operation 840 of FIG. 8 analogous to operation 740 of FIG. 7. When the number of times that the virtual object in the first state is browsed exceeds the number of preset times (830—NO), the electronic device may bypass displaying the second visual object in operation 840. For example, when the number of times that the virtual object in the first state is browsed exceeds the preset number (830—NO), the electronic device may refrain from displaying the second visual object.

Referring to FIG. 8, in operation 850 according to an embodiment, the electronic device may determine whether an input indicating to browse the first visual object has been identified. The input may be identified by a sensor (e.g., the sensor 250 of FIG. 2) included in the electronic device based on the above description with reference to FIG. 6. The electronic device may perform operation 850 of FIG. 8 similar to operation 750 of FIG. 7. Before identifying an input indicating to browse the first visual object (850—NO), the electronic device may maintain displaying the first visual object. When the electronic device displays the second visual object in operation 840, the electronic device may maintain displaying the second visual object together with the first visual object before identifying an input indicating to browse the first visual object (850—NO).

Referring to FIG. 8, in a state in which an input indicating to browse the first visual object is identified (850—YES), the electronic device may store information indicating that the first visual object has been browsed based on operation 860. The electronic device may perform operations 850 and 860 of FIG. 8, similar to the operation 750 of FIG. 7. For example, the information may include data for visualizing the virtual object in the first state in operation 810. The information may be stored in an electronic device or an external electronic device providing the virtual object in the first state. When the state of the virtual object is modified to another state different from the first state after operation 860, the information stored in operation 860 may be used to represent the virtual object in the first state together with the virtual object in the other state to the user of the electronic device.

Figure 9:
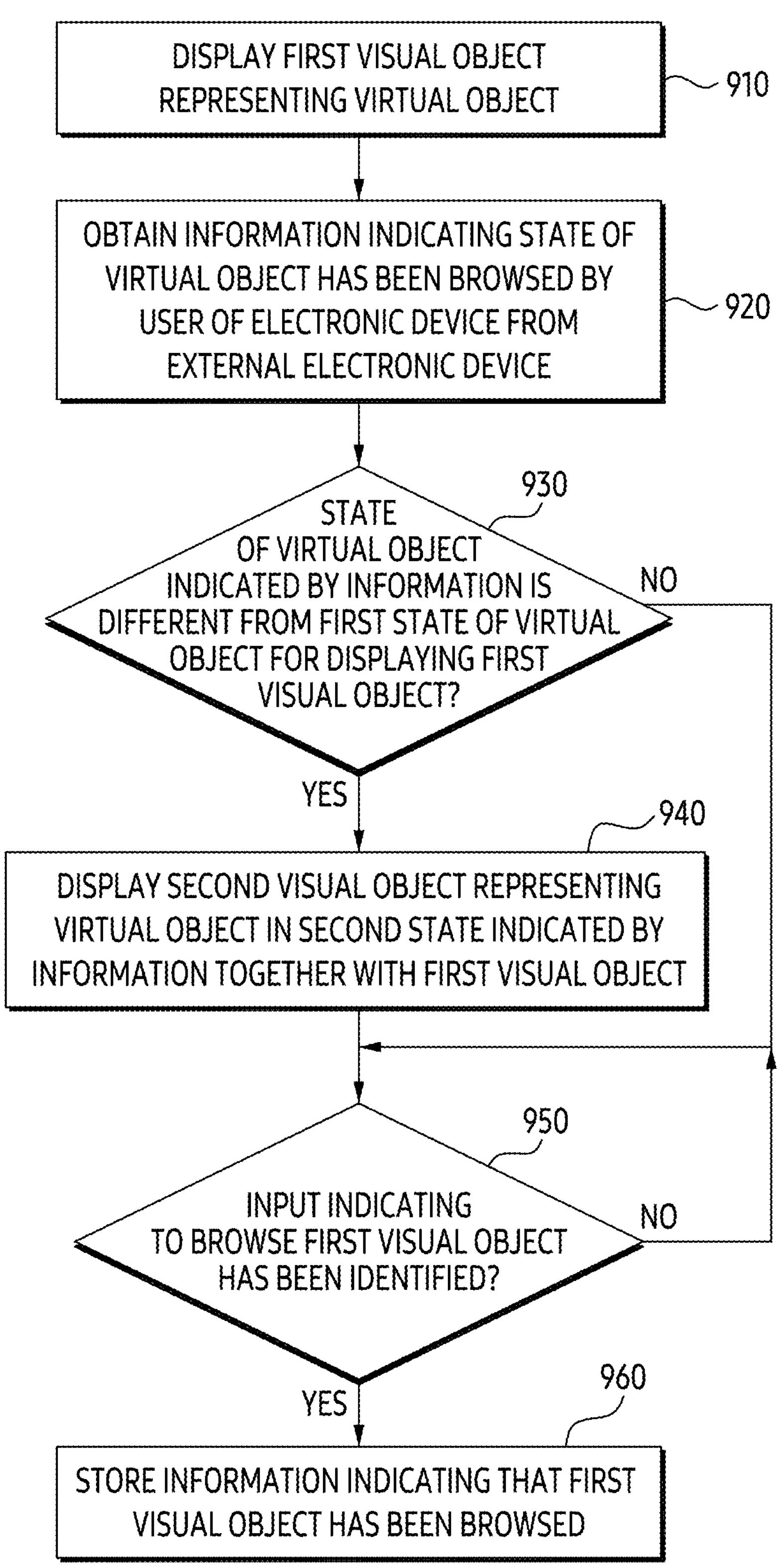
FIG. 9 illustrates an example of a flowchart of an electronic device according to an embodiment.

FIG. 9 illustrates an example of a flowchart of an electronic device according to an embodiment. The electronic device of FIG. 9 may include the electronic device 101 of FIGS. 1, 2 3, 4A, 4B, 4C, 5A, 5B, 6, and 7. The operations of the electronic device 101 of FIG. 9 may be performed by the electronic device 101 of FIG. 2 and/or the processor 210 in the electronic device 101 of FIG. 2. At least one of the operations of FIG. 9 may be related to at least one of operations of the electronic device 101 of FIG. 7 and/or operations of FIG. 8.

Referring to FIG. 9, in operation 910, according to an embodiment, the electronic device may display a first visual object representing a virtual object. The electronic device may perform operation 910 of FIG. 9 similar to operation 720 of FIG. 7 and/or operation 810 of FIG. 8.

Referring to FIG. 9, in operation 920, according to an embodiment, the electronic device may obtain information indicating the state of the virtual object browsed by the user of the electronic device (e.g., the user 110 of FIGS. 1-6) from the external electronic device (e.g., the external electronic device 120 of FIGS. 1-7). For example, the electronic device may request the external electronic device to transmit the information of operation 735 of FIG. 7. For example, the electronic device may identify the information within a signal transmitted from the external electronic device to display the first visual object of operation 910. Based on operation 920, the electronic device may obtain the information including a history of displaying the virtual object to the user of the electronic device.

Referring to FIG. 9, in operation 930, according to an embodiment, the electronic device may identify whether the state of the virtual object indicated by the information in operation 920 is different from the first state of the virtual object for displaying the first visual object. For example, the electronic device may identify whether the state of the virtual object displayed by the user of the electronic device is different from the first state. For example, when the virtual object is modified between the first timing in which the first visual object is displayed based on operation 910 and the second timing in which the virtual object is displayed prior to operation 910, the electronic device may identify that the first state of the virtual object in operation 910 is different from the state of the virtual object in the second timing.

When the first state of the virtual object for displaying the first visual object and the second state of the virtual object indicated by the information in operation 920 are different (930—YES), the electronic device may display a second visual object representing the virtual object in the second state indicated by the information in operation 930 together with the first visual object, based on operation 940. The electronic device may perform operation 940 of FIG. 9 similar to operation 740 of FIG. 7 and/or operation 840 of FIG. 8. When the first state and the second state match (930—YES), the electronic device may bypass performing operation 940. In a state in which performing operation 940 is bypassed, the electronic device may refrain from displaying the second visual object of operation 940.

Referring to FIG. 9, in operation 950, according to an embodiment, the electronic device may identify whether an input indicating to browse the first visual object has been identified. The electronic device may perform operation 950 of FIG. 9 similar to operation 750 of FIG. 7 and/or operation 850 of FIG. 8. Before identifying the input in operation 950, the electronic device may maintain displaying the first visual object.

In a state of identifying the input indicating to browse the first visual object (950—YES), the electronic device according to an embodiment may store information indicating that the first visual object has been browsed, based on operation 960. The electronic device may perform operation 960 of FIG. 9 similar to operation 860 of FIG. 8.

Metaverse is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality, and it is characterized by using avatars to not only enjoy games or virtual reality (VR, cutting-edge technology that enables people to experience real-life experiences in a computerized virtual world), but also social and cultural activities like real reality.

Such a metaverse service may be provided in at least two forms. The first form is to provide services to users by using a server, and the second form is to provide services through individual contacts between users.

Figure 10:
FIG. 10 is an exemplary diagram of a first embodiment environment in which a metaverse service is provided through a server.
Figure 10:
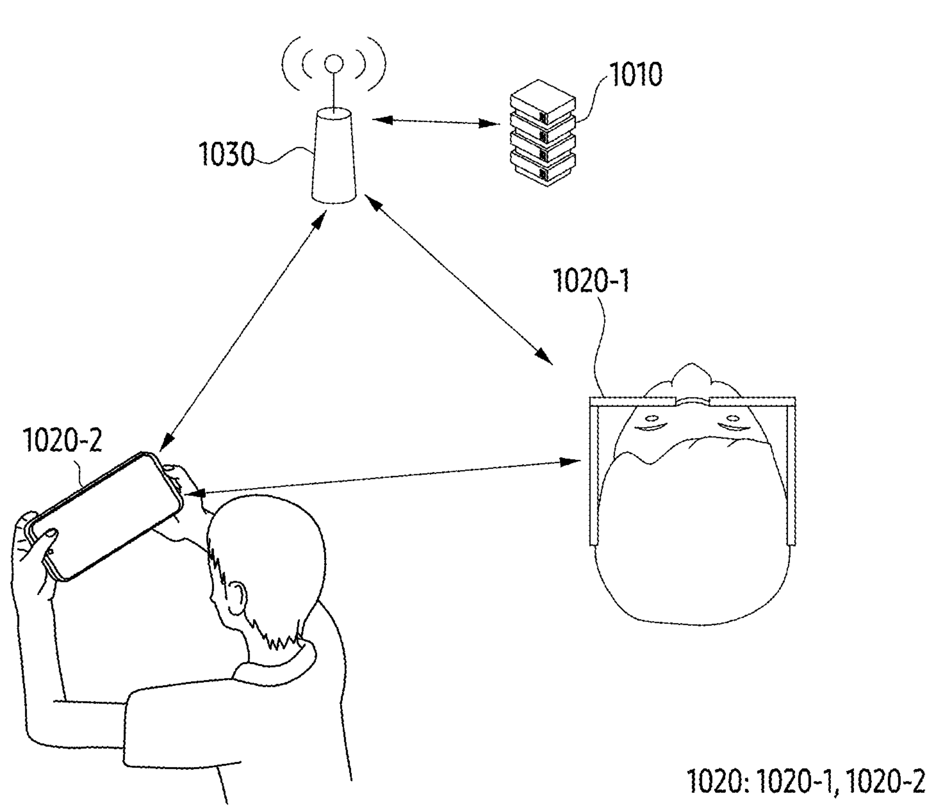

FIG. 10 is an exemplary diagram of a first embodiment environment 1001 in which a metaverse service is provided through a server 1010.

Referring to FIG. 10, the first embodiment environment 1001 includes a server 1010 providing a metaverse service, a network (e.g., a network formed by at least one intermediate node 1030 including an access point (AP) and/or a base station) connecting the server 1010 and each of the user terminals (e.g., a user terminal 1020 including a first terminal 1020-1 and a second terminal 1020-2), and a user terminal that enable the use of services by accessing the server through the network. The server 1010 provides input and output to the metaverse service to the user.

In this case, the server 1010 provides a virtual space so that the user terminal 1020 may perform an activity in the virtual space. In addition, the user terminal 1020 installs an S/W agent for accessing the virtual space provided by the server 1010 to represent the information provided by the server 1010 to the user or transmits the information that the user wants to represent in the virtual space to the server.

The S/W agent may be directly provided through the server 1010 or downloaded from a public server, or may be embedded when purchasing a terminal.

Figure 11:
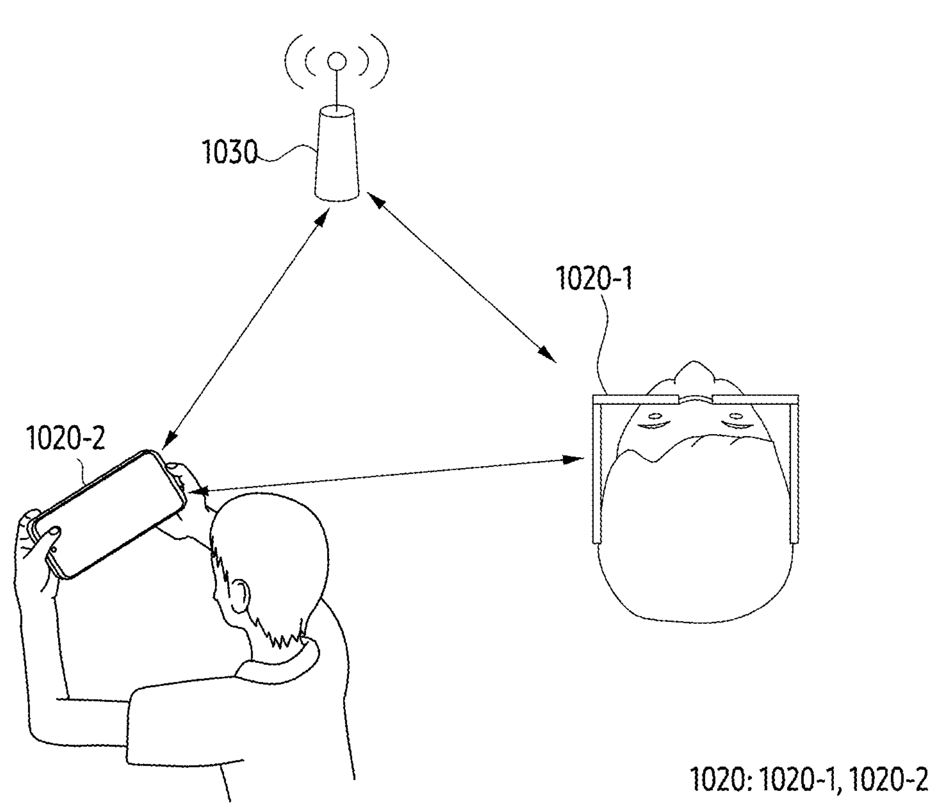
FIG. 11 is an exemplary diagram of a second embodiment environment in which a metaverse service is provided through direct connection between user terminals and a second terminal.

FIG. 11 is an exemplary diagram of a second embodiment environment 1002 in which a metaverse service is provided through direct connection between user terminals and a second terminal (e.g., a first terminal 1020-1 and a second terminal 1020-2).

Referring to FIG. 11, the environment 1002 of the second embodiment includes a first terminal 1020-1 providing a metaverse service, a network connecting each user terminal (e.g., a network formed by at least one intermediate node 1030), and a second terminal 1020-2 that allows a second user to use the service by inputting/outputting to the metaverse service by connecting to the first terminal 1020-1 through the network.

The second embodiment is characterized in that the first terminal 1020-1 provides a metaverse service by performing the role of a server (e.g., the server 1010 of FIG. 10) in the first embodiment. That is, it may be seen that the metaverse environment may be configured only by connecting the device to the device.

In the first and second embodiments, the user terminal 1020 (or the user terminal 1020 including the first terminal 1020-1 and the second terminal 1020-2) may be made of various form factors, and is characterized in that it includes an output device that provides an image or/and sound to a user and an input device for inputting information into a metaverse service. Examples of various form factors of the user terminal 1020 may include a smartphone (e.g., the second terminal 1020-2), an AR device (e.g., the first terminal 1020-1), a VR device, an MR device, a VST device, or TV or projector capable of input/output, and the like. Although first and second embodiments are described for illustration purposes, it should be appreciated that the environments 1001 and 1002 are not meant to be exclusive. In one or more embodiments, user terminals can seamlessly switch between operation in the example environments 1001 and 1002. In one or more embodiments, user terminals could operate in example environments 1001 and 1002.

The network of one or more embodiments in the present invention (e.g., a network formed by at least one intermediate node 1030) includes all of various broadband networks including 3G, 4G, and 5G and a short-range network (e.g., a wired network or wireless network directly connecting the first terminal 1020-1 and the second terminal 1020-2) including Wi-Fi, BT, and the like.

The user terminal 1020 of FIGS. 10 to 11 may be an example of the electronic device 101 of FIGS. 1-7 and/or the electronic device of FIGS. 8 and 9. The server 1010 of FIG. 10 may be an example of the external electronic device 120 of FIGS. 1-7 and/or the external electronic device of FIGS. 8 and 9.

As described above, according to an embodiment, in a state in which at least a portion of the virtual space provided by the external electronic device is visualized, the electronic device may display a visual object representing another user connected to the user of the electronic device through the virtual space. In the state in which the visual object in the first state is displayed, the electronic device may identify a history in which a visual object in a second state different from the first state is displayed as a visual object representing the other user. Based on identifying the history, the electronic device may display another visual object in the second state together with the visual object in the first state.

A method of displaying a history of modification of a visual object representing another user distinguished from the user may be required to users of an electronic device. As described above, according to an embodiment, an electronic device (e.g., the electronic device 101 of FIGS. 1 to 7) may comprise a display (e.g., the display 240 of FIG. 2), a communication circuitry (e.g., communication circuit 230 of FIG. 2), and a processor (e.g., the processor 210 of FIG. 2). The processor may be configured to display, based on information received from an external electronic device (e.g., the external electronic device 120 of FIGS. 1-7) connected through the communication circuitry, a first visual object (e.g., visual objects 330, 340, 350, 360 in FIG. 3, visual objects 442 in FIG. 4A, visual objects 462 in FIGS. 4B and 4C, visual objects 524 in FIG. 5A, and/or visual objects 340 in FIG. 6) representing a user in the display. The processor may be configured to identify, based on the information, a number of times that the first visual object has been displayed through the display. The processor may be configured to display, based on identifying the number of times is lower than a preset number, a second visual object (e.g., the visual objects 345, 355, 365 of FIG. 3) representing the user before the first visual object, with the first visual object in the display. According to an embodiment, the electronic device may display a second visual object previously displayed as a representation of the user prior to the first visual object, together with a first visual object representing the user.

For example, in a virtual space (e.g., the virtual space 140 of FIG. 1) including the first visual object, the processor may be configured to obtain the information including interaction history of a user of the electronic device and the user corresponding to the first visual object.

For example, the processor may be configured to identify, from the information, the number of times that the first visual object has been browsed by a user of the electronic device through the display.

For example, the processor may be configured to store, based on an input indicating that the first visual object is browsed, another information associated with the first visual object with a timing when the input is identified.

For example, the electronic device may further comprise a sensor (e.g., the sensor 250 of FIG. 2). The processor may be configured to identify, based on a direction of a gaze of a user of the electronic device that is identified by using data of the sensor, the input.

For example, the processor may be configured to display, based on a video received from the external electronic device, the first visual object (e.g., the visual object 350 of FIG. 3).

For example, the processor may be configured to display, based on receiving information including an avatar for representing the user from the external electronic device, the first visual object (e.g., the visual objects 330, 340, and 360 of FIG. 3) corresponding to at least portion of the avatar.

For example, the electronic device may further comprise a memory (e.g., a memory 220 in the electronic device 101 of FIG. 2). The processor may be configured to refrain from displaying, based on identifying data indicating a user corresponding to the first visual object in a contact list stored in the memory, at least portion of the second visual object, and display at least portion of the data with the first visual object.

For example, the processor may be configured to display, in a state displaying the second visual object with the first visual object, animation transforming from the second visual object to the first visual object.

As described above, according to an embodiment, a method of an electronic device may comprise displaying (e.g., operation 910 of FIG. 9) to a first user of the electronic device, a first visual object which represents a second user and is included in a virtual space. The method may comprise obtaining (e.g., operation 920 of FIG. 9), from an external electronic device, information indicating a visual object has been browsed by the first user. The method may comprise displaying (e.g., operation 940 of FIG. 9) based on identifying a second visual object different from the first visual object from the information, the second visual object with the first visual object that is displayed to the first user.

For example, the displaying the second visual object may comprise identifying (e.g., operation 930 of FIG. 9), based on states of one or more virtual object combined with an avatar of the second user, wherein the states are obtained by the information, whether the visual object indicated by the information is different from the first visual object.

For example, the displaying the second visual object may comprise transmitting, in response to an input indicating that the first visual object is browsed, a signal for modifying the information stored in the external electronic device based on the first visual object.

For example, the displaying the second visual object may comprise identifying, based on data of a sensor of the electronic device, a direction of a gaze of the first user in a display of the electronic device. The displaying the second visual object may comprise identifying the input based on the identified direction.

For example, the identifying the input may comprise obtaining, based on the identified direction, a duration or a number of times that the first visual object has been browsed. The identifying the input may comprise identifying the input based on at least one of the duration or the number of times.

For example, the displaying the second visual object may comprise displaying an intermediate form between the second visual object and the first visual object.

For example, a method of an electronic device may comprise Displaying (e.g., operation 810 of FIG. 8), based on information received from an external electronic device connected through a communication circuitry of the electronic device, a first visual object representing a user in a display of the electronic device. The method may comprise identifying (e.g., operation 820 of FIG. 8) based on the information, a number of times that the first visual object has been displayed through the display. The method may comprise displaying (e.g., operation 840 of FIG. 8) based on identifying the number of times is lower than a preset number, a second visual object representing the user before the first visual object, with the first visual object in the display.

For example, the identifying may comprise obtaining the information including interaction history of a user of the electronic device and the user corresponding to the first visual object, in the virtual space including the first visual object.

For example, the identifying may comprise identifying, from the information, the number of times that the first visual object has been browsed by a user of the electronic device through the display.

For example, the identifying may comprise storing, based on an input indicating that the first visual object is browsed, another information associated with the first visual object with a timing when the input is identified.

For example, the displaying the first visual object may comprise displaying, based on a video received from the external electronic device, the first visual object.

For example, the identifying may comprise refraining from displaying, based on identifying data indicating a user corresponding to the first visual object in a contact list stored in a memory of the electronic device, at least portion of the second visual object, and displaying at least portion of the data with the first visual object.

For example, the displaying the second visual object may comprise displaying animation transforming from the second visual object to the first visual object.

As described above, according to an embodiment, an electronic device (e.g., the electronic device 101 of FIGS. 1-7) may comprise a display (e.g., the display 240 of FIG. 2), a communication circuitry (e.g., the communication circuit 230 of FIG. 2), and a processor (e.g., the processor 210 of FIG. 2). The processor may be configured to displaying, to a first user (e.g., the first user 110-1 of FIG. 1) of the electronic device through the display, a first visual object (e.g., the second visual object 160-2 in FIG. 1, the visual objects 330, 340, 350, 360 in FIG. 3, the visual object 442 in FIG. 4A, the visual object 462 in FIGS. 4B and 4C, the visual object 524 in FIG. 5A, and/or the visual object 340 in FIG. 6) which represents a second user (e.g., the second user 110-2 of FIG. 1) and is included in a virtual space (e.g., the virtual space 140 in FIG. 1). The processor may be configured to obtaining, from an external electronic device (e.g., the external electronic device 120 of FIGS. 1-7) through the communication circuitry, information indicating a visual object has been browsed by the first user. The processor may be configured to displaying, based on identifying a second visual object (e.g., the visual object 172 of FIG. 1 and/or the visual objects 345, 355, 365 of FIG. 3) different from the first visual object from the information, the second visual object with the first visual object that is displayed to the first user.

For example, the processor may be configured to identify, based on states of one or more virtual object combined with an avatar of the second user, wherein the states are obtained by the information, whether the visual object indicated by the information is different from the first visual object.

For example, the processor may be configured to transmit, in response to an input indicating that the first visual object is browsed, a signal for modifying the information stored in the external electronic device based on the first visual object.

For example, the electronic device may comprise a sensor (e.g., the sensor 250 of FIG. 2). The processor may be configured to identify, based on data of the sensor, a direction of a gaze of the first user in a display. The processor may be configured to identify the input based on the identified direction.

For example, the processor may be configured to obtain, based on the identified direction, a duration or a number of times that the first visual object has been browsed. The processor may be configured to identify the input based on at least one of the duration or the number of times.

For example, the processor may be configured to display an intermediate form between the second visual object and the first visual object.

As described above, according to an embodiment, a wearable device may comprise a display, a processor, memory storing instructions. The instructions may, when executed by the processor, cause the wearable device to, based on receiving an input for entering a virtual space, display on the display the virtual space. The instructions may, when executed by the processor, cause the wearable device to display within the virtual space a first avatar which is a current representation of a user and has a first appearance. The instructions may, when executed by the processor, cause the wearable device to display within the virtual space a first avatar together with a visual object for a second avatar which is a previous representation of the user and has a second appearance different from the first appearance of the first avatar.

According to an embodiment, a wearable device may comprise a display, a memory for storing instructions and at least one processor for executing the instructions. The at least processor may be configured to receive, based on an input indicating to enter a virtual space, information from an external electronic device that is associated with an avatar positioned within the virtual space. The at least processor may be configured to display, based on receiving the information, at least portion of the virtual space including the avatar of a first appearance. The at least processor may be configured to display, based on the information further including the avatar of a second appearance which was displayed by the wearable device before receiving the input, a visual object with the avatar which represents the avatar of the second appearance.

For example, the at least one processor may be configured to display the visual object including text associated with timing when the avatar changed from the second appearance to the first appearance.

For example, the at least one processor may be configured to display, while displaying the avatar having a combined form of at least one virtual object representing clothing, the visual object to visualize a history in which the clothing coupled to the avatar was modified.

For example, the at least one processor may be configured to, while displaying the avatar and the visual object, based on identifying a direction of gaze of a user towards the avatar or the visual object, cease to display the visual object.

For example, the at least one processor may be configured to, while displaying the avatar and the visual object, based on identifying an audio signal associated with an identifier of the avatar, cease to display the visual object.

For example, the at least one processor may be configured to display, based on the information further including the avatar of the second appearance which was displayed by the wearable device before receiving the input, the avatar with an indicator positioned in association with the avatar. The at least processor may be configured to display, based on another input with respect to the indicator, the visual object and cease to display the indicator.

For example, the at least one processor may be configured to refrain from displaying the visual object while displaying an identifier of the avatar.

As described above, according to an embodiment, a non-transitory computer-readable medium may be configured to store instructions. The instructions may be configured to, when executed by at least one processor of a wearable device, cause the at least one processor to, based on receiving an input for entering a virtual space, display on a display of the wearable device the virtual space. The instructions may be configured to, when executed by at least one processor of a wearable device, cause the at least one processor to display within the virtual space a first avatar which is a current representation of a user and has a first appearance. The instructions may be configured to, when executed by at least one processor of a wearable device, cause the at least one processor to display within the virtual space a first avatar together with a visual object for a second avatar which is a previous representation of the user and has a second appearance different from the first appearance of the first avatar.

According to an embodiment, a non-transitory computer-readable medium may be configured to store instructions. The instructions may be configured to, when executed by at least one processor of a wearable device, cause the at least one processor to receive, based on an input indicating to enter a virtual space, information from an external electronic device that is associated with an avatar positioned within the virtual space. The instructions may be configured to, when executed by at least one processor of a wearable device, cause the at least one processor to display, based on receiving the information, at least portion of the virtual space including the avatar of a first appearance. The instructions may be configured to, when executed by at least one processor of a wearable device, cause the at least one processor to display, based on the information further including the avatar of a second appearance which was displayed by the wearable device before receiving the input, a visual object with the avatar which represents the avatar of the second appearance.

For example, the instructions may be configured to, when executed by at least one processor of a wearable device, cause the at least one processor to display the visual object including text associated with timing when the avatar changed from the second appearance to the first appearance.

For example, the instructions may be configured to, when executed by at least one processor of a wearable device, cause the at least one processor to display, while displaying the avatar having a combined form of at least one virtual object representing clothing, the visual object to visualize a history in which the clothing coupled to the avatar was modified.

For example, the instructions may be configured to, when executed by at least one processor of a wearable device, cause the at least one processor to, while displaying the avatar and the visual object, based on identifying a direction of gaze of a user towards the avatar or the visual object, cease to display the visual object.

For example, the instructions may be configured to, when executed by at least one processor of a wearable device, cause the at least one processor to, while displaying the avatar and the visual object, based on identifying audio signal associated with an identifier of the avatar, cease to display the visual object.

For example, the instructions may be configured to, when executed by at least one processor of a wearable device, cause the at least one processor to display, based on the information further including the avatar of the second appearance which was displayed by the wearable device before receiving the input, the avatar with an indicator positioned in association with the avatar. The instructions may be configured to, when executed by at least one processor of a wearable device, cause the at least one processor to, based on another input with respect to the indicator, display the visual object and cease to display the indicator.

For example, the instructions may be configured to, when executed by at least one processor of a wearable device, cause the at least one processor to refrain from displaying the visual object while displaying an identifier of the avatar.

As described above, according to an embodiment, a method of an electronic device may comprise identifying, based on a request of a wearable device for entering a virtual space, information of an avatar within the virtual space. The method may comprise, based on identifying the information of the avatar of a first appearance, transmitting, based on identifying that the avatar of the first appearance is different from the avatar of a second appearance which was displayed by the wearable device before the request, the information to the wearable device including the avatar of the first appearance and a history of modification of the avatar from the second appearance to the first appearance. The method may comprise, based on identifying the information of the avatar of the first appearance, transmitting, based on identifying that the avatar of the first appearance is identical to the avatar of the second appearance, the information to the wearable device including the avatar of the first appearance without the history.

According to an embodiment, a method of a wearable device comprising a display, memory and a processor is provided. The method may comprise, based on receiving an input for entering a virtual space, displaying on the display the virtual space. The method may comprise displaying within the virtual space a first avatar which is a current representation of a user and has a first appearance. The method may comprise displaying within the virtual space a first avatar together with a visual object for a second avatar which is a previous representation of the user and has a second appearance different from the first appearance of the first avatar.

For example, the transmitting the information with the history may comprise transmitting the information including text associated with timing when the avatar changed from the second appearance to the first appearance.

For example, the identifying may comprise identifying the information of the avatar having a combined form of at least one virtual object representing clothing, and wherein the information includes a timing that the at least one virtual object is combined to the avatar.

For example, the method may comprise determining, by comparing the timing to latest timing the avatar displayed by the wearable device, whether to transmit the information including the history.

For example, the identifying may comprise identifying, based on the request, the information of the avatar that is different from another avatar which represents a user logged in the wearable device.

For example, the method may comprise storing, in response to a signal from the wearable device indicating that an input for browsing the avatar or the visual object was received, information indicating that the avatar of the first appearance was browsed by a user of the wearable device.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. A head-wearable electronic device comprising:

a display;

communication circuitry;

at least one processor comprising processing circuitry;

memory storing instructions, comprising one or more storage media; and wherein the instructions, when executed by the at least one processor individually or collectively, cause the head-wearable device to:

display at least one avatar through the display;

based on displaying the at least one avatar through the display in accordance with a first appearance, identify a representation of the at least one avatar;

based on identifying a change in the representation from the first appearance to a second appearance that is different from the first appearance, display, at least one visual object concurrently with the at least one avatar in accordance with the second appearance, the at least one visual object having the first appearance of the at least one avatar; and in accordance with a determination that the representation of the at least one avatar is the same as the first appearance, refrain from displaying the at least one visual object.

2. The head-wearable electronic device of claim 1, wherein the instructions, when executed by the at least one processor individually or collectively, cause the head-wearable device to:

receive, from an external electronic device via the communication circuitry, information including a history of modification of the at least one avatar; and based on the information, identify whether the representation of the at least one avatar has been changed to the second appearance from the first appearance.

3. The head-wearable electronic device of claim 1, wherein the instructions, when executed by the at least one processor individually or collectively, cause the head-wearable device to:

identify a direction of gaze of a user; and based on identifying the direction of gaze toward the at least one visual object, cease to display the at least one visual object.

4. The head-wearable electronic device of claim 1, wherein the instructions, when executed by the at least one processor individually or collectively, cause the head-wearable device to:

receive an input for displaying a screen of a virtual space; and based on the input, display a plurality of avatars through the display, wherein the plurality of avatars respectively represents other users different from a user of the head-wearable electronic device.

5. The head-wearable electronic device of claim 1, wherein the instructions, when executed by the at least one processor individually or collectively, cause the head-wearable device to:

based on identifying that the representation of the at least one avatar has been changed to the second appearance from the first appearance, display at least one indicator in association with the at least one avatar; and based on a user input with respect to the at least one indicator, display the at least one visual object together with at least one avatar.

6. The head-wearable electronic device of claim 1, further comprising a microphone, wherein the instructions, when executed by the at least one processor individually or collectively, cause the head-wearable device to:

receive an audio signal using the microphone; and based on texts assigned to the at least one visual object identified from the audio signal while displaying the at least one visual object, cease to display the at least one visual object.

7. A non-transitory computer readable storage medium storing instructions, wherein the instructions, when executed by a head-wearable electronic device including a display, and communication circuitry, cause the head-wearable electronic device to:

display at least one avatar through the display;

based on displaying the at least one avatar through the display in accordance with a first appearance, identify representation of the at least one avatar;

based on identifying a change in the representation from the first appearance to a second appearance that is different from the first appearance, display, at least one visual object concurrently with the at least one avatar in accordance with the second appearance, the at least one visual object having the first appearance of the at least one avatar; and in accordance with a determination that the representation of the at least one avatar is the same as the first appearance, refrain from displaying the at least one visual object.

8. The non-transitory computer readable storage medium of claim 7, wherein the instructions, when executed by the head-wearable electronic device, cause the head-wearable electronic device to:

receive, from an external electronic device via the communication circuitry, information including a history of modification of the at least one avatar; and based on the information, identify whether the representation of the at least one avatar has been changed to the second appearance from the first appearance.

9. The non-transitory computer readable storage medium of claim 7, wherein the instructions, when executed by the head-wearable electronic device, cause the head-wearable electronic device to:

identify a direction of gaze of a user; and based on identifying the direction of gaze toward the at least one visual object, cease to display the at least one visual object.

10. The non-transitory computer readable storage medium of claim 7, wherein the instructions, when executed by the head-wearable electronic device, cause the head-wearable electronic device to:

receive an input for displaying a screen of a virtual space; and based on the input, display a plurality of avatars through the display.

11. The non-transitory computer readable storage medium of claim 7, wherein the instructions, when executed by the head-wearable electronic device, cause the head-wearable electronic device to:

based on identifying that the appearance of the at least one avatar has been changed to the second appearance from the first appearance, display at least one indicator in association with the at least one avatar; and based on a user input with respect to the at least one indicator, display the at least one visual object together with at least one avatar.

12. The non-transitory computer readable storage medium of claim 7, wherein the instructions, when executed by the head-wearable electronic device including a microphone, cause the head-wearable electronic device to:

receive an audio signal using the microphone; and based on texts assigned to the at least one visual object identified from the audio signal while displaying the at least one visual object, cease to display the at least one visual object.

13. The non-transitory computer readable storage medium of claim 7, wherein the instructions, when executed by the head-wearable electronic device, cause the head-wearable electronic device to:

display the at least one visual object indicating at least portion of the at least one avatar included in, among the first appearance and the second appearance, the first appearance of the at least one avatar.

14. A method of a head-wearable electronic device including a display, and communication circuitry, cause the head-wearable electronic device to:

displaying at least one avatar through the display;

based on displaying the at least one avatar through the display in accordance with a first appearance, identifying an appearance of the at least one avatar;

based on identifying a change in the appearance of the at least one avatar from the first appearance to a second appearance that is different from the first appearance, displaying, at least one visual object concurrently with the at least one avatar in accordance with the second appearance, the at least one visual object having the first appearance of the at least one avatar; and in accordance with a determination that the representation of the at least one avatar is the same as the first appearance, refrain from displaying the at least one visual object.

15. The method of claim 14, further comprises:

receiving, from an external electronic device via the communication circuitry, information including a history of modification of the at least one avatar; and based on the information, identifying whether the representation of the at least one avatar has been changed to the second appearance from the first appearance.

16. The method of claim 14, further comprises:

identifying a direction of gaze of a user; and based on identifying the direction of gaze toward the at least one visual object, ceasing to display the at least one visual object.

17. The method of claim 14, further comprises:

receiving an input for displaying a screen of a virtual space; and based on the input, displaying a plurality of avatars through the display.

* * * * *